United States Patent
Tetsuya et al.

[11] Patent Number: 5,434,711
[45] Date of Patent: Jul. 18, 1995

[54] ZOOM LENS SYSTEM

[75] Inventors: Abe Tetsuya; Ito Takayuki, both of Tokyo, Japan

[73] Assignee: Asahi Kogaku Kogyo Kabushiki Kaisha, Tokyo, Japan

[21] Appl. No.: 134,685

[22] Filed: Oct. 12, 1993

[30] Foreign Application Priority Data

Oct. 12, 1992 [JP] Japan .................... 4-273044

[51] Int. Cl.$^6$ .................. G02B 15/14; G02B 3/02
[52] U.S. Cl. .................. 359/689; 359/716; 359/715
[58] Field of Search .............. 359/689, 716, 715

[56] References Cited

U.S. PATENT DOCUMENTS

| | | | |
|---|---|---|---|
| 4,822,152 | 4/1989 | Yamanashi | 359/686 |
| 5,087,988 | 2/1992 | Nakayama | 359/689 |
| 5,166,828 | 11/1992 | Ogata | 359/689 |
| 5,327,290 | 7/1994 | Fukushima et al. | 359/689 |

FOREIGN PATENT DOCUMENTS

| | | | |
|---|---|---|---|
| 0087418 | 5/1984 | Japan | 359/715 |
| 0182010 | 8/1986 | Japan | 359/715 |
| 5088085 | 4/1993 | Japan | 359/689 |
| 2259789 | 3/1993 | United Kingdom | 359/689 |
| 2260201 | 4/1993 | United Kingdom | 359/689 |
| 2260423 | 4/1993 | United Kingdom | 359/689 |

*Primary Examiner*—Georgia Y. Epps
*Assistant Examiner*—Evelyn A. Lester
*Attorney, Agent, or Firm*—Sughrue, Mion, Zinn, Macpeak & Seas

[57] ABSTRACT

The improved zoom lens system comprises, in order from the object side, a positive first lens group, a positive second lens group and a negative third lens group, the second lens group consisting of a single positive lens group that has aspheric surfaces on both surfaces closest to the object and closest to the image, and all of the first, second and third lens groups are moved towards the object during a zoom from the wide-angle end to the narrow-angle end, the lens system further satisfying specific conditions.

This zoom lens system is capable of exhibiting a zoom ratio of at least 2.5 using 4 or 5 lens elements and has an F number of about 1:4–8 to make itself practical for use with still cameras.

8 Claims, 18 Drawing Sheets

ZOOM LENS SYSTEM

BACKGROUND OF THE INVENTION

This invention is based upon and claims a priority from Japanese Patent Application No. Hei. 4-273044 filed Oct. 12, 1992 by the present assignee, a disclosure of which is incorporated by reference herein.

This invention relates to a zoom lens system that is suitable for use with compact cameras which have small constraint on back focus. More particularly, the invention relates to a zoom lens system that uses a smaller number of lens elements and which yet features a high zoom ratio of at least 2.5.

Various types of zoom lens systems have heretofore been known for use with compact cameras and they can be categorized in two major classes according to the number of lens elements used; the first class uses at least ten lens elements and features a zoom ratio of about 2.8 (see, for example, Japanese Patent Laid-Open Publication No. Sho 63-43115) and the second class uses a smaller number of elements (6 to 8 lenses) but makes extensive use of aspheric surfaces to feature a zoom ratio of 2.2 to 2.8 (see, for example, Japanese Patent Laid-Open Publication No. Hei 4-78810).

However, these conventional zoom lens systems are still unsatisfactory from the viewpoint of reducing the number of lens elements and, hence, they suffer from the problem of high production cost. Example 5 of the invention described in Japanese Patent Laid-Open Publication No. Hei 3-150518 proposes a zoom lens system that uses only four lens elements and which yet features a zoom ratio of about 2.8. However, this lens system has a very large F number (1:9.6–28.3) and is substantially unsuitable for use with still cameras.

SUMMARY OF THE INVENTION

The present invention has been accomplished under these circumstances and has as an object providing a zoom lens system that is capable of exhibiting a zoom ratio of at least 2.5 using 4 or 5 lens elements and which has an F number of about 1:4–8 to make itself practical for use with still cameras.

This object of the present invention can be attained by a zoom lens system that comprises, in order from the object side, a positive first lens group, a positive second lens group and a negative third lens group, the second lens group consisting of a single positive lens group that has aspheric surfaces on its surface closest to the object and on its surface closest to the image, and in which all of said first, second and third lens groups are moved towards the object during a zoom from the wide-angle end to the narrow-angle end, said lens system further satisfying the following conditions:

$$-0.9 < rIIo/fs < -0.3 \quad (a)$$

$$-0.5 < rIIi/fs < -0.2 \quad (b)$$

$$0.1 < dII/fs < 0.3 \quad (c)$$

$$-0.005 < \Delta Xo/fs < 0 \quad (d)$$

$$-0.001 < \Delta Xi/fs < 0 \quad (e)$$

where rIIo: the radius of curvature, relative to the paraxial ray, of the surface closest to the object side of the second lens group;

rIIi: the radius of curvature, relative to the paraxial ray, of the surface on the image side of the second lens group;

fs: the focal length of the overall system at the wide-angle end;

dII: the sum of the thicknesses of lens elements in the second lens group;

$\Delta Xo$: the amount of asphericity, relative to the paraxial ray, of the surface closest to the object side of the second lens group; and $\Delta Xi$: the amount of asphericity, relative to the paraxial ray, of the surface closest to the image side of the second lens group.

DESCRIPTION OF THE PREFERRED EMBODIMENTS

Figure 1:
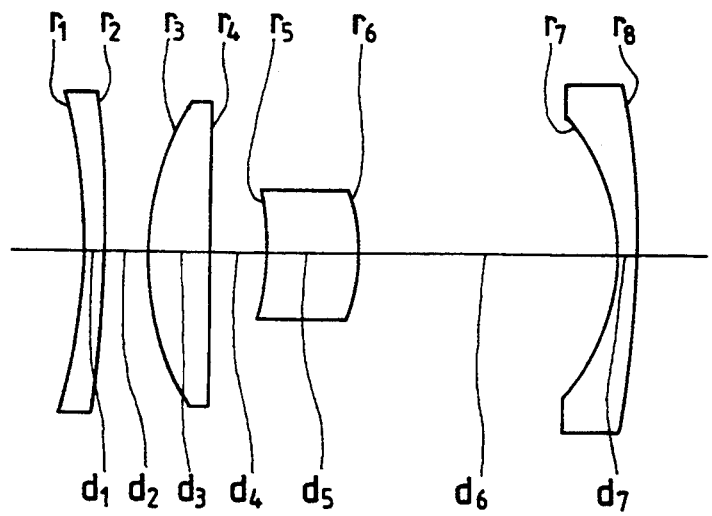
FIG. 1 is a simplified cross-sectional view showing the zoom lens system according to Example 1 of the present invention at the wide-angle end.

The preferred embodiments of the present invention are described below in detail. A typical example of the zoom lens system according to the preferred embodiments is shown in FIG. 1 and it comprises, in order from the object side which is on the left of the drawing, a positive first lens group that is composed of a positive and a negative lens element which are defined by r1 to r4 surfaces, a second lens group of positive meniscus that is biaspheric as defined by r5 and r6 surfaces and which has a concave surface directed towards the object, and a negative third lens group that is defined by r7 and r8 surfaces.

Conditions (a), (b) and (c) all relate to the lens shape of the second lens group. Condition (a) must be satisfied to insure that the aberrations that develop in the positive first lens group are effectively corrected by the concave surface on the object side of the second lens group. If the lower limit of this condition is not exceeded, the radius of curvature of the concave surface is too large to achieve satisfactory correction of the aberrations that develop in the positive first lens group. If the upper limit of condition (a) is exceeded, the radius of curvature of the concave surface is too small to prevent the occurrence of higher-order aberrations.

Condition (b) must be satisfied to insure that the divergent aberrations that develop in the second lens group which satisfies condition (a) can be effectively corrected by the convex surface on the image side of the second lens group. If the lower limit of this condition is not reached, the radius of curvature of the convex surface is too large to effectively correct the aberrations that develop on the concave surface on the object side, causing increased aberrational variations during a zoom. If the upper limit of condition (b) is exceeded, the radius of curvature of the convex surface is too small to prevent the occurrence of higher-order aberrations.

Condition (c) relates to the sum of the thicknesses of lens elements in the second lens group and a balance between aberrations can be attained by insuring that the concave aspheric surface on the object side of the second lens group is sufficiently departed from the convex surface on the image side to satisfy condition (c). If the upper limit of this condition is exceeded, the total lens thickness increases so much that it becomes impossible to manufacture a compact lens system at low cost. If the lower limit of condition (c) is not reached, the distance between the concave and convex surfaces is so much reduced that the balance between aberrations is upset.

Condition (d) and (e) both specify the shapes of the aspheric surfaces in the second lens group and they must be satisfied in order to insure that the second lens group having large power is composed of only one group.

Condition (d) defines the shape of the aspheric concave surface on the object side of the second lens group. For the purpose of correcting the aberrations that develop in the first lens group, the concave surface on the object side of the second lens group is desirably such an aspheric surface that the curvature of concavity increases from the center outward of the lens. If the upper limit of condition (d) is exceeded, the aberrations are undercorrected; if the lower limit of this condition is not reached, the result is favorable for the purpose of correcting distortion but, on the other hand, spherical aberration, coma and astigmatism will be overcorrected by the aspheric surface. The amount of change in spherical aberration coefficient that is caused by the concave aspheric surface, $\Delta I_o$, and the amount of change in distortion coefficient that is also caused by that aspheric surface, $\Delta V_o$, desirably satisfy the following conditions:

$$-60 < \Delta I_o < -20, \ 0.07 < \Delta V_o < 0.3$$

Condition (e) defines the shape of the aspheric convex surface on the image side of the second lens group and it must be satisfied to insure that the spherical surface, coma and astigmatism that have been overcorrected by the concave surface on the object side are effectively corrected by the convex surface on the image side. If the upper limit of condition (e) is exceeded, the aberrations that develop at the concave surface on the object side cannot be effectively corrected; if the lower limit of this condition is not reached, higher-order aberrations will develop and this is not preferred for the purposes of the present invention. The amount of change in spherical aberration coefficient that is caused by the convex aspheric surface, $\Delta Ii$, and the amount of change in distortion coefficient that is also caused by that aspheric surface, $\Delta Vi$, desirably satisfy the following conditions:

$$0 < \Delta Ii < 20, \quad -0.01 < \Delta Vi < 0$$

If the second lens group is to be composed of only one lens element, it desirably satisfies the following conditions (f) and (g):

$$1.54 < nII \quad \text{(f)}$$

$$65 < \nu dII \quad \text{(g)}$$

where
nII: the refractive index of the second lens group at the d-line; and
$\nu d$: the Abbe number of the second lens group at the d-line.

Condition (f) must be satisified in order to assure the large power of the second lens group without reducing the radius of curvature of lens surfaces. By using a high-index glass that satisfies this condition (f), a large power can be assured while causing less aberrations.

Condition (g) specifies the upper limit of the Abbe number of the second lens group. By using a low-dispersion glass that satisfies this condition (g), the development of chromatic aberration can be suppressed.

Depending on the kind of optical material used, manufacturing difficulty may be involved in working an aspheric surface on both sides of the material. In that case, the chromatic aberration that develops in the second lens group may be corrected by designing it as a cemented lens consisting of a negative and a positive lens element, with the outer surface of each lens being rendered aspheric.

The following examples are provided for the purpose of further illustrating the present invention but are in no way to be taken as limiting.

EXAMPLE 1

FIG. 1 is a simplified cross-sectional view showing diagrammatically the composition of the zoom lens system according to Example 1. Specific numerical data are given in Tables 1 and 2 below, wherein FNo. denotes the F number, f the focal length, $\omega$ the half view angle, r the radius of curvature, d the lens thickness or airspace, n the refractive index at the d-line (588 nm), and $\nu$ the Abbe number.

Figure 2:
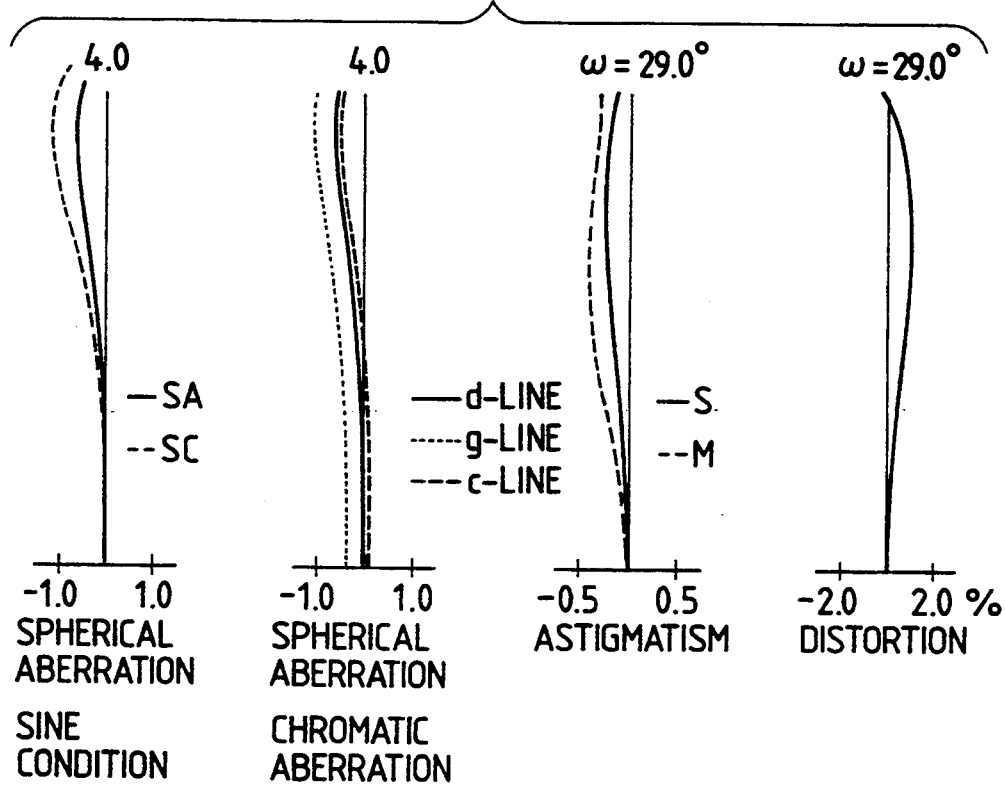
FIG. 2 is a set of graphs plotting the curves of various aberrations that occur in the lens system of Example 1 at the wide-angle end.

FIG. 2 is a set of graphs plotting the curves of various aberrations that occur in the lens system at the wide-angle end; the aberration illustrated are spherical aberration SA, sine condition Sc, chromatic aberrations as expressed by spherical aberrations at the d-, g- and c-lines, astigmatism (S, sagittal; M, meridional), and distortion.

Figure 3:
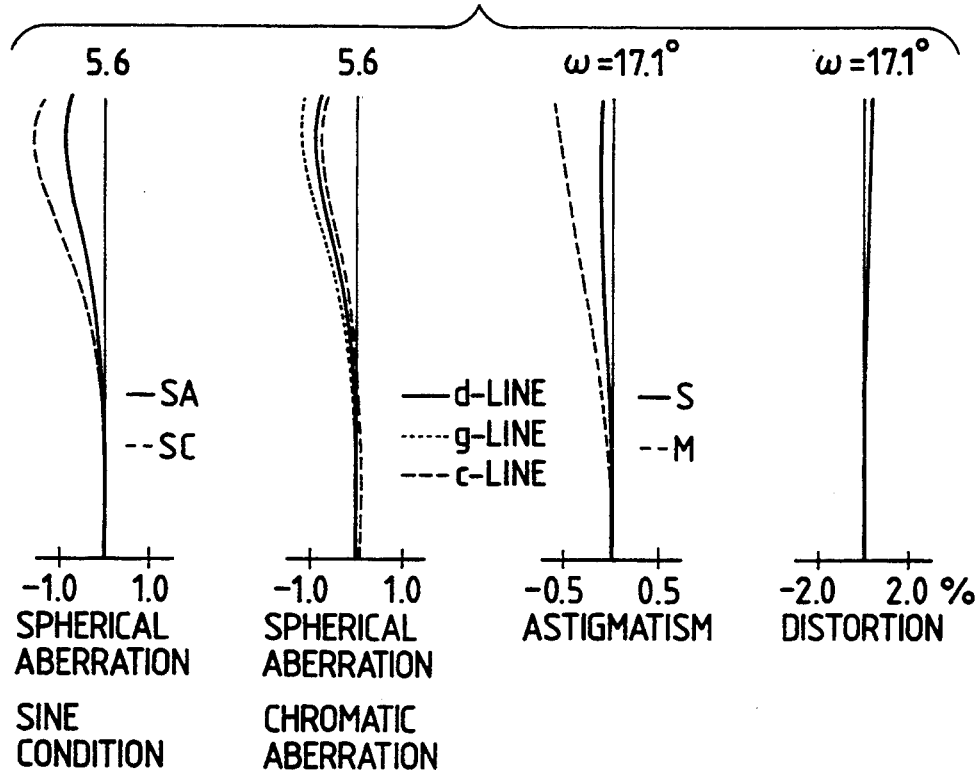
FIG. 3 is a set of graphs plotting the curves of various aberrations that occur in the lens system of Example 1 at the middle-angle end.
Figure 4:
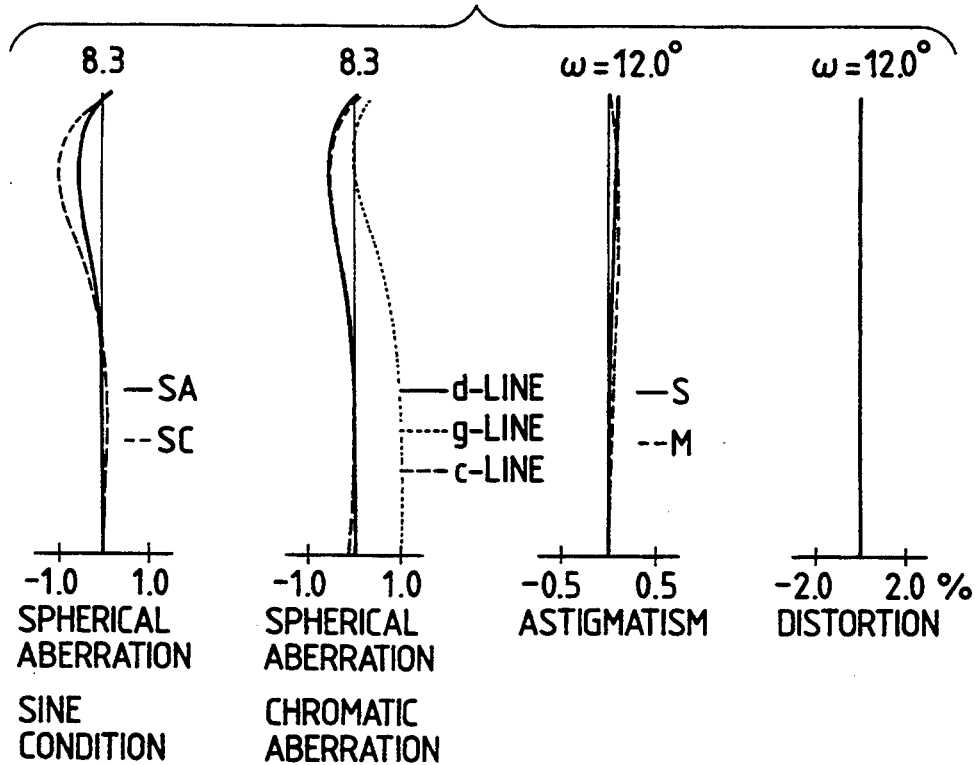
FIG. 4 is a set of graphs plotting the curves of various aberrations that occur in the lens system of Example 1 at the telephoto end.

FIGS. 3 and 4 are sets of graphs plotting the curves of these aberrations that occur in the lens system at the middle-angle and telephoto ends, respectively.

Surfaces 3, 5, 6 and 8 in the lens system are aspheric. The shape of an aspheric surface can generally be expressed by the following equation:

$$X = (CY^2/1 + \sqrt{1 - (1 + K)C^2Y^2}) + A4Y^4 + A6Y^6 + A8Y^8$$

where X is the distance by which the coordinates at the point on the aspheric surface where the height from the optical axis is Y are departed from the plane tangent to the vertex of the aspheric surface; C is the curvature (1/r) of the vertex of the aspheric surface; K is the conic constant; and A4, A6 and A8 are the aspheric coefficients of the fourth, sixth and eighth orders, respectively.

The aspheric coefficients of surfaces 3, 5, 6 and 8 are listed in Table 3.

TABLE 1

| Surface No. | r | d | n | $\nu$ |
|---|---|---|---|---|
| 1 | −41.458 | 1.50 | 1.80518 | 25.4 |
| 2 | −86.809 | 3.12 | | |
| 3 | 19.566 | 4.65 | 1.48749 | 70.2 |
| 4 | −474.488 | variable | | |
| 5 | −24.839 | 7.00 | 1.56907 | 71.3 |
| 6 | −13.422 | variable | | |
| 7 | −14.767 | 1.50 | 1.72916 | 54.7 |
| 8 | −97.699 | | | |

TABLE 2

| f | 39.18 | 70.29 | 101.99 |
|---|---|---|---|
| fB | 8.83 | 29.76 | 50.42 |
| FNo. | 1:4.0 | 1:6.0 | 1:8.3 |
| $\omega$ | 29.0° | 17.1° | 12.0° |
| d4 | 4.02 | 12.71 | 16.79 |
| d6 | 19.46 | 10.77 | 6.69 |

TABLE 3

| Surface 3 | Surface 5 |
|---|---|
| K = 0.000000 | K = 0.000000 |
| A4 = −0.448935 × 10$^{-5}$ | A4 = −0.146059 × 10$^{-3}$ |
| A6 = 0.107166 × 10$^{-7}$ | A6 = −0.173594 × 10$^{-6}$ |
| A8 = −0.144700 × 10$^{-10}$ | A8 = −0.247105 × 10$^{-7}$ |
| Surface 6 | Surface 8 |
| K = 0.000000 | K = 0.000000 |
| A4 = −0.326389 × 10$^{-4}$ | A4 = −0.238040 × 10$^{-4}$ |
| A6 = −0.676378 × 10$^{-6}$ | A6 = −0.475656 × 10$^{-7}$ |
| A8 = 0.150118 × 10$^{-7}$ | A8 = −0.161289 × 10$^{-9}$ |

EXAMPLE 2

Figure 5:
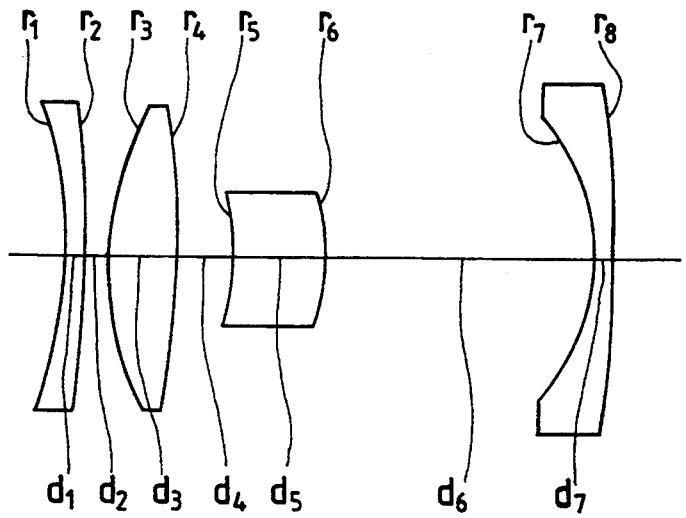
FIG. 5 is a simplified cross-sectional view showing the zoom lens system according to Example 2 of the present invention at the wide-angle end.
Figure 6:
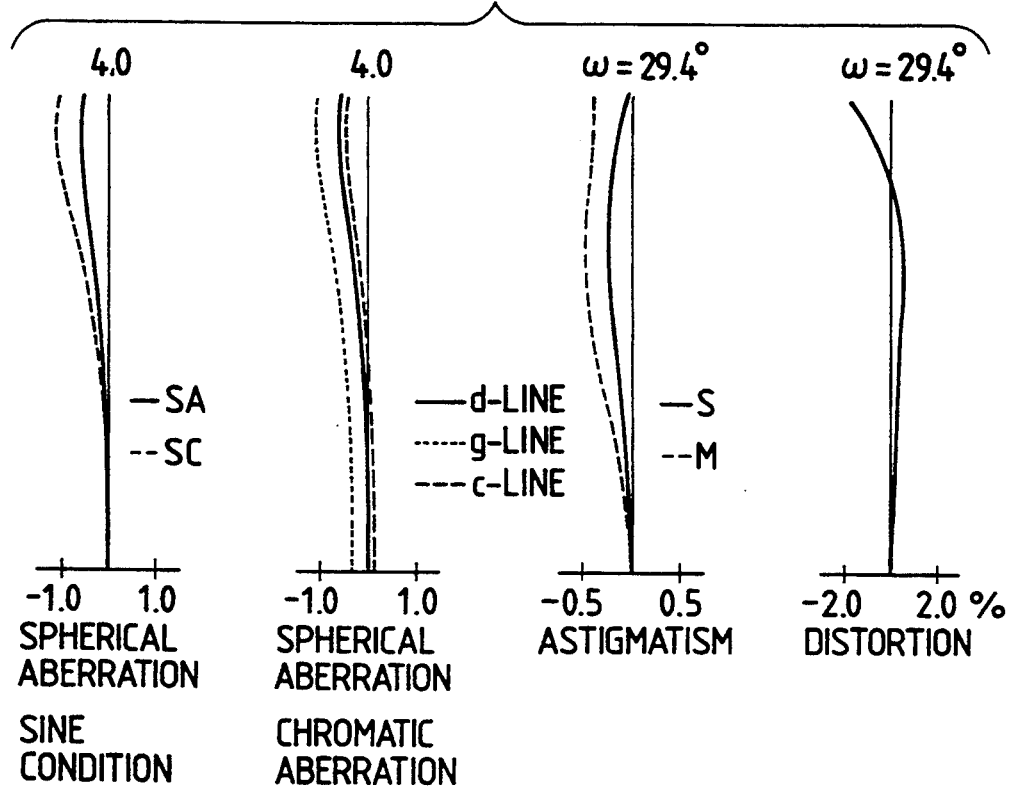
FIG. 6 is a set of graphs plotting the curves of various aberrations that occur in the lens system of Example 2 at the wide-angle end.
Figure 7:
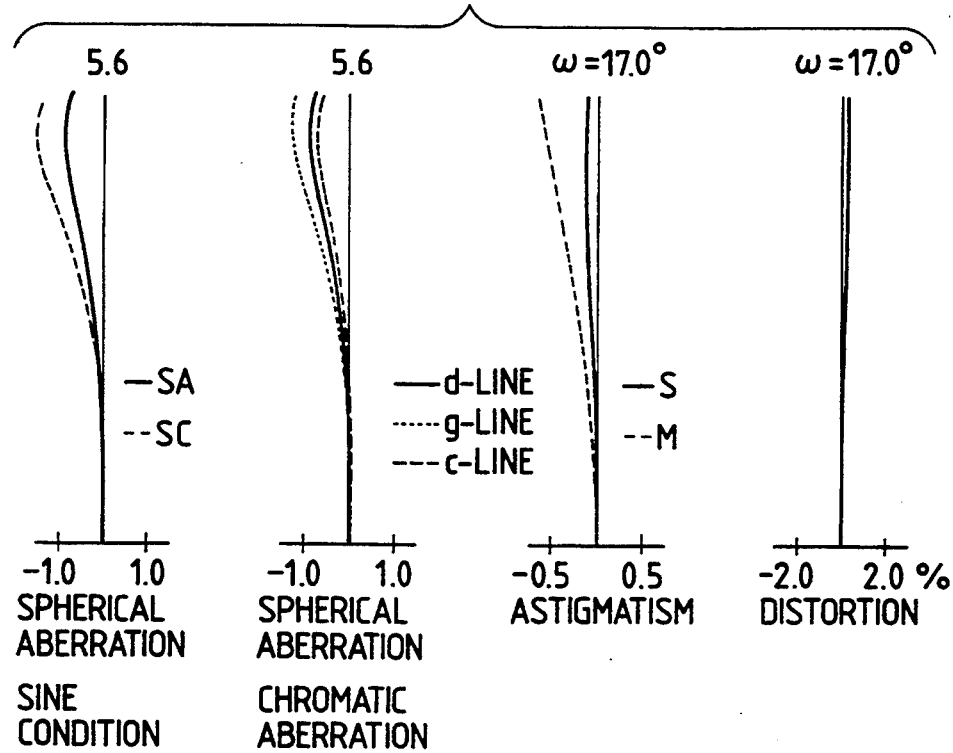
FIG. 7 is a set of graphs plotting the curves of various aberrations that occur in the lens system of Example 2 at the middle-angle end.
Figure 8:
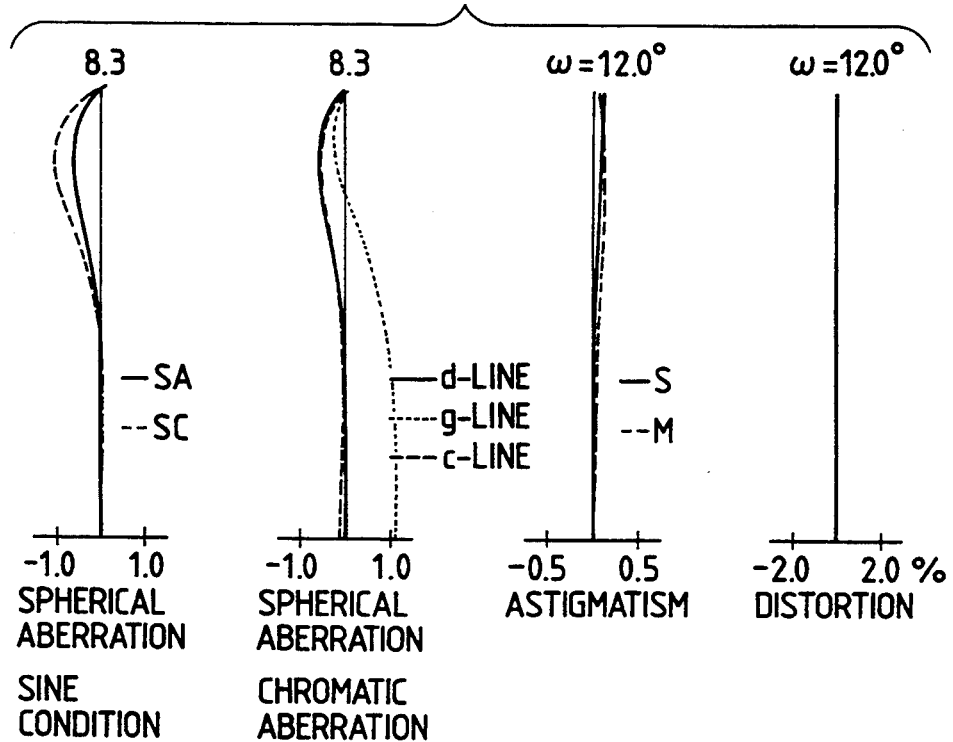
FIG. 8 is a set of graphs plotting the curves of various aberrations that occur in the lens system of Example 2 at the telephoto end.

FIG. 5 is a simplified cross-sectional view showing diagrammatically the composition of the zoom lens system according to Example 2 of the present invention. Specific numerical data are given in Tables 4 and 5. FIGS. 6, 7 and 8 are three sets of graphs plotting the curves of various aberrations that occur in the lens system at the wide-angle, middle-angle and telephoto ends, respectively.

In the lens system of Example 2, surfaces 3, 5, 6 and 8 are aspheric and their aspheric coefficients are listed in Table 6.

TABLE 4

| Surface No. | r | d | n | ν |
|---|---|---|---|---|
| 1 | −31.020 | 1.50 | 1.80518 | 25.4 |
| 2 | −73.063 | 1.72 | | |
| 3 | 21.437 | 5.10 | 1.49176 | 57.4 |
| 4 | −62.262 | variable | | |
| 5 | −24.602 | 7.00 | 1.56907 | 71.3 |
| 6 | −13.407 | variable | | |
| 7 | −15.135 | 1.50 | 1.72916 | 54.7 |
| 8 | −133.724 | | | |

TABLE 5

| f | 39.18 | 70.46 | 102.01 |
|---|---|---|---|
| fB | 9.09 | 30.15 | 50.78 |
| FNo. | 1:4.0 | 1:6.0 | 1:8.3 |
| ω | 29.4° | 17.0° | 12.0° |
| d4 | 4.02 | 12.48 | 16.39 |
| d6 | 18.55 | 11.08 | 7.18 |

TABLE 6

| Surface 3 | Surface 5 |
|---|---|
| K = 0.000000 | K = 0.000000 |
| A4 = −0.670999 × $10^{-5}$ | A4 = −0.148070 × $10^{-3}$ |
| A6 = −0.163250 × $10^{-7}$ | A6 = −0.150662 × $10^{-6}$ |
| A8 = −0.237285 × $10^{-10}$ | A8 = −0.220492 × $10^{-7}$ |

| Surface 6 | Surface 8 |
|---|---|
| K = 0.000000 | K = 0.000000 |
| A4 = −0.345729 × $10^{-4}$ | A4 = −0.234515 × $10^{-4}$ |
| A6 = −0.474119 × $10^{-6}$ | A6 = 0.369171 × $10^{-7}$ |
| A8 = 0.100347 × $10^{-7}$ | A8 = −0.135281 × $10^{-9}$ |

EXAMPLE 3

Figure 9:
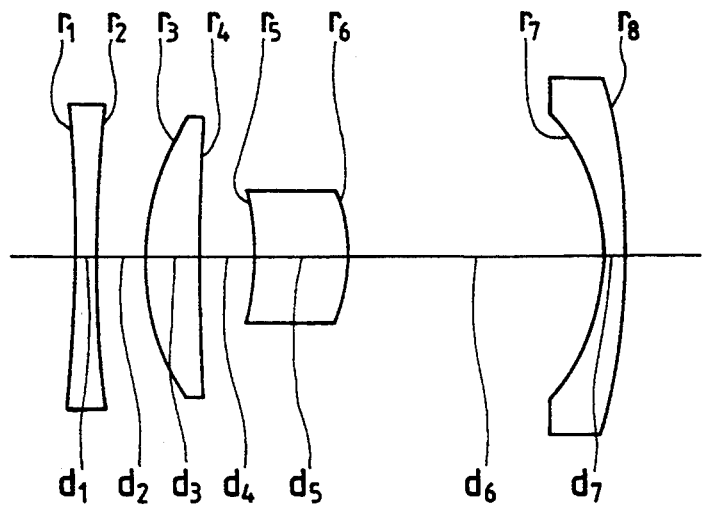
FIG. 9 is a simplified cross-sectional view showing the zoom lens system according to Example 3 of the present invention at the wide-angle end.
Figure 10:
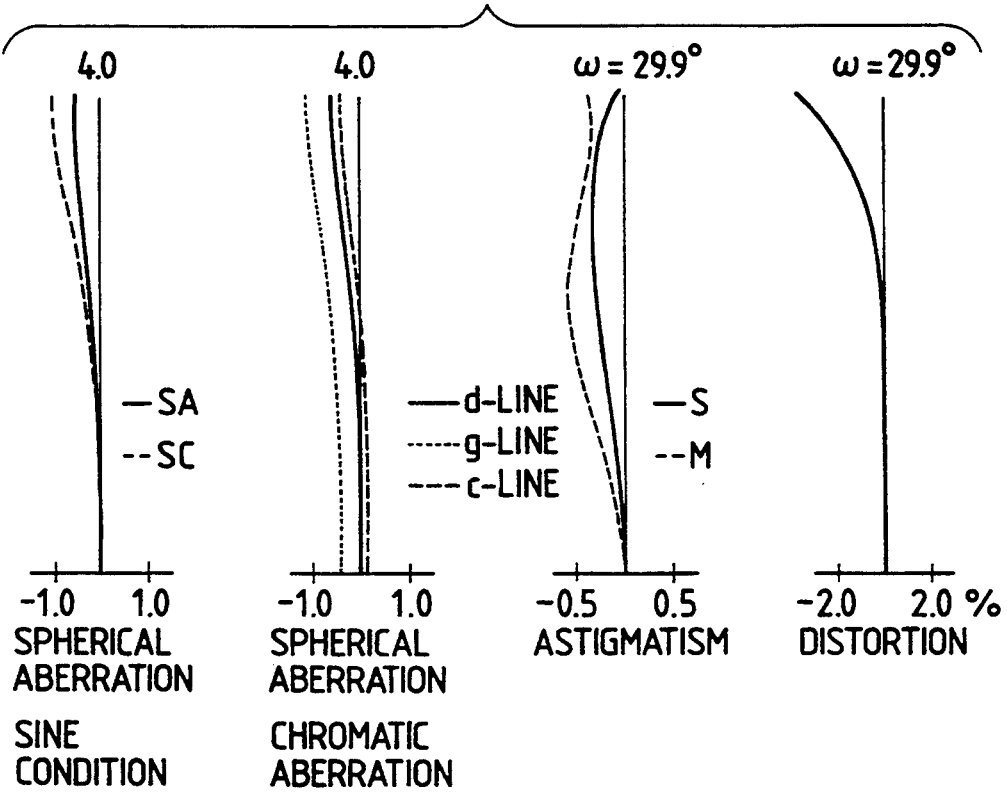
FIG. 10 is a set of graphs plotting the curves of various aberrations that occur in the lens system of Example 3 at the wide-angle end.
Figure 11:
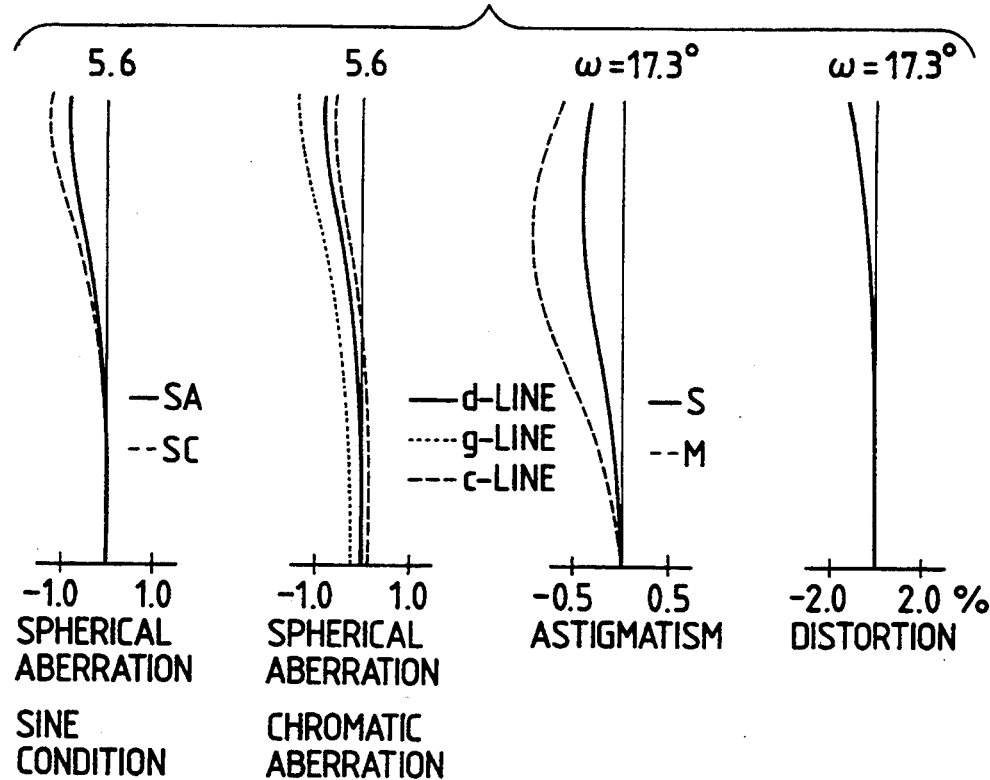
FIG. 11 is a set of graphs plotting the curves of various aberrations that occur in the lens system of Example 3 at the middle-angle end.
Figure 12:
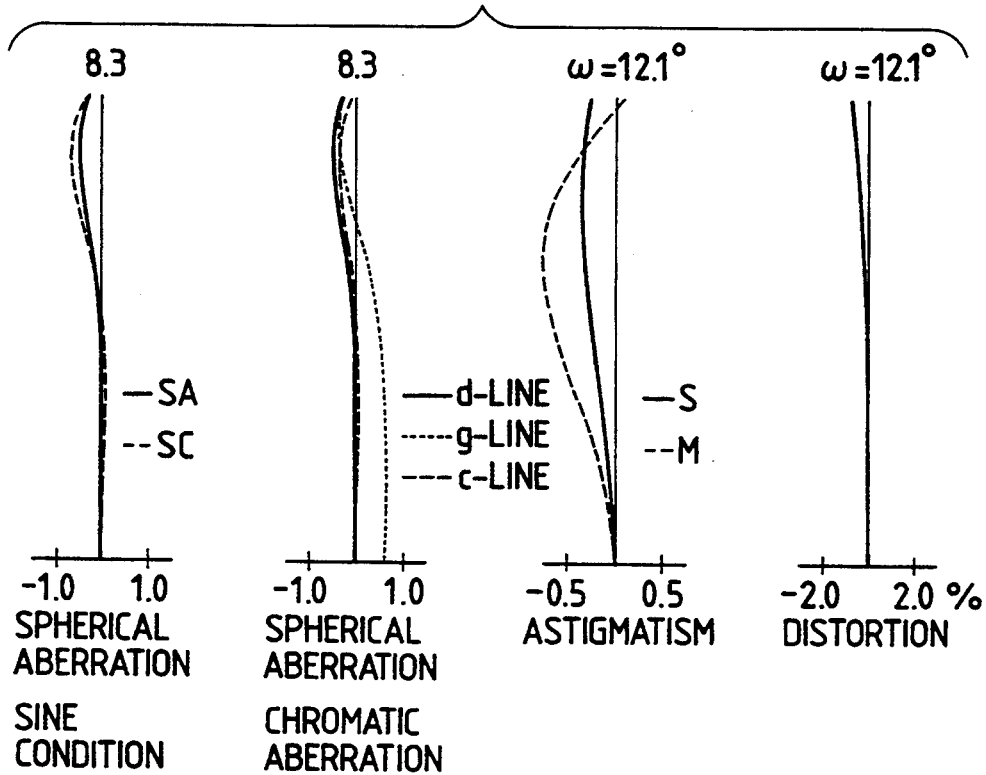
FIG. 12 is a set of graphs plotting the curves of various aberrations that occur in the lens system of Example 3 at the telephoto end.

FIG. 9 is a simplified cross-sectional view showing diagrammatically the composition of the zoom lens system according to Example 3 of the present invention. Specific numerical data are given in Tables 7 and 8. FIGS. 10, 11 and 12 are three sets of graphs plotting the curves of various aberrations that occur in the lens system at the wide-angle, middle-angle and telephoto ends, respectively.

In the lens system of Example 3, surfaces 1, 5, 6 and 8 are aspheric and their aspheric coefficients are listed in Table 9.

TABLE 7

| Surface No. | r | d | n | ν |
|---|---|---|---|---|
| 1 | −162.515 | 1.50 | 1.58547 | 29.9 |
| 2 | 80.541 | 3.48 | | |
| 3 | 17.385 | 4.03 | 1.48749 | 70.2 |
| 4 | 130.270 | variable | | |
| 5 | −25.887 | 7.00 | 1.56907 | 71.3 |
| 6 | −12.931 | variable | | |
| 7 | −14.393 | 1.50 | 1.72916 | 54.7 |
| 8 | −72.937 | | | |

TABLE 8

| f | 39.18 | 70.49 | 102.00 |
|---|---|---|---|
| fB | 9.41 | 32.09 | 54.42 |
| FNO. | 1:4.0 | 1:6.0 | 1:8.3 |
| ω | 29.9° | 17.3° | 12.1° |
| d4 | 4.02 | 12.31 | 16.03 |
| d6 | 18.26 | 10.96 | 7.25 |

TABLE 9

| Surface 1 | Surface 5 |
|---|---|
| K = 0.000000 | K = 0.000000 |
| A4 = −0.624791 × $10^{-5}$ | A4 = −0.167365 × $10^{-3}$ |
| A6 = −0.240622 × $10^{-7}$ | A6 = −0.280221 × $10^{-6}$ |
| A8 = 0.944113 × $10^{-10}$ | A8 = −0.275681 × $10^{-7}$ |

| Surface 6 | Surface 8 |
|---|---|
| K = 0.000000 | K = 0.000000 |
| A4 = −0.348976 × $10^{-4}$ | A4 = −0.335516 × $10^{-4}$ |
| A6 = −0.291059 × $10^{-6}$ | A6 = 0.839274 × $10^{-7}$ |
| A8 = 0.186744 × $10^{-8}$ | A8 = −0.319973 × $10^{-9}$ |

EXAMPLE 4

Figure 13:
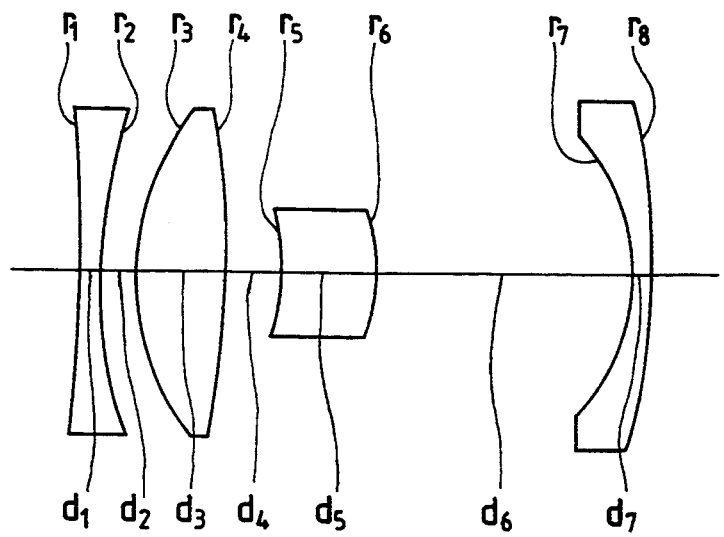
FIG. 13 is a simplified cross-sectional view showing the zoom lens system according to Example 4 of the present invention at the wide-angle end.
Figure 14:
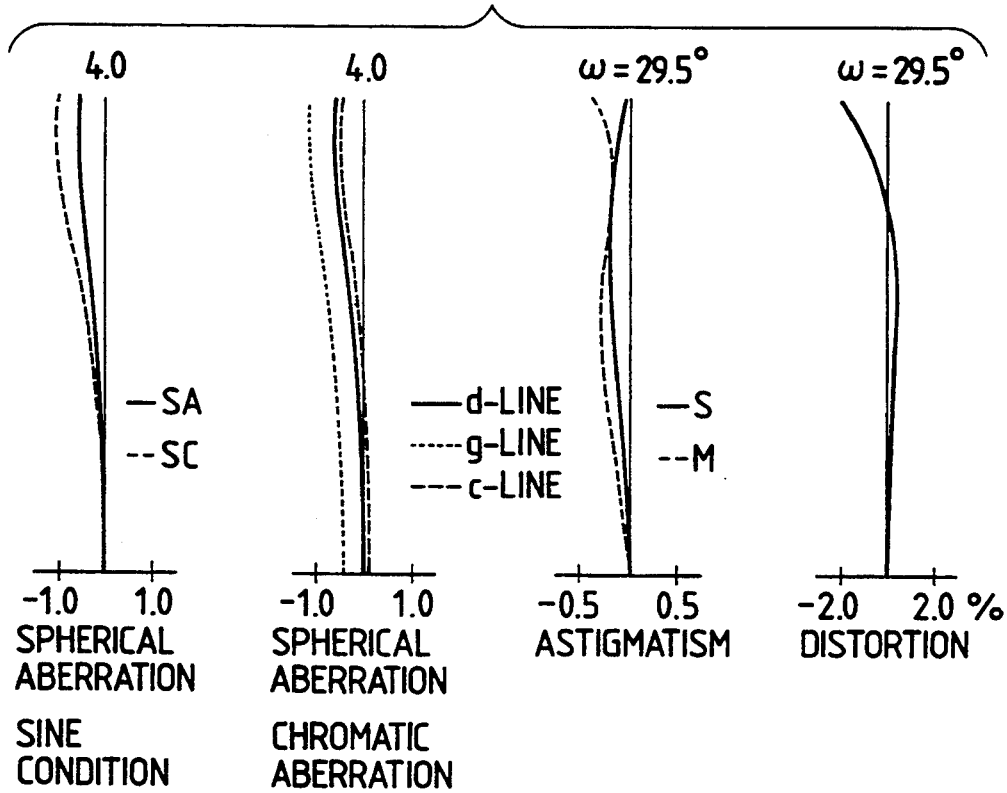
FIG. 14 is a set of graphs plotting the curves of various aberrations that occur in the lens system of Example 4 at the wide-angle end.
Figure 15:
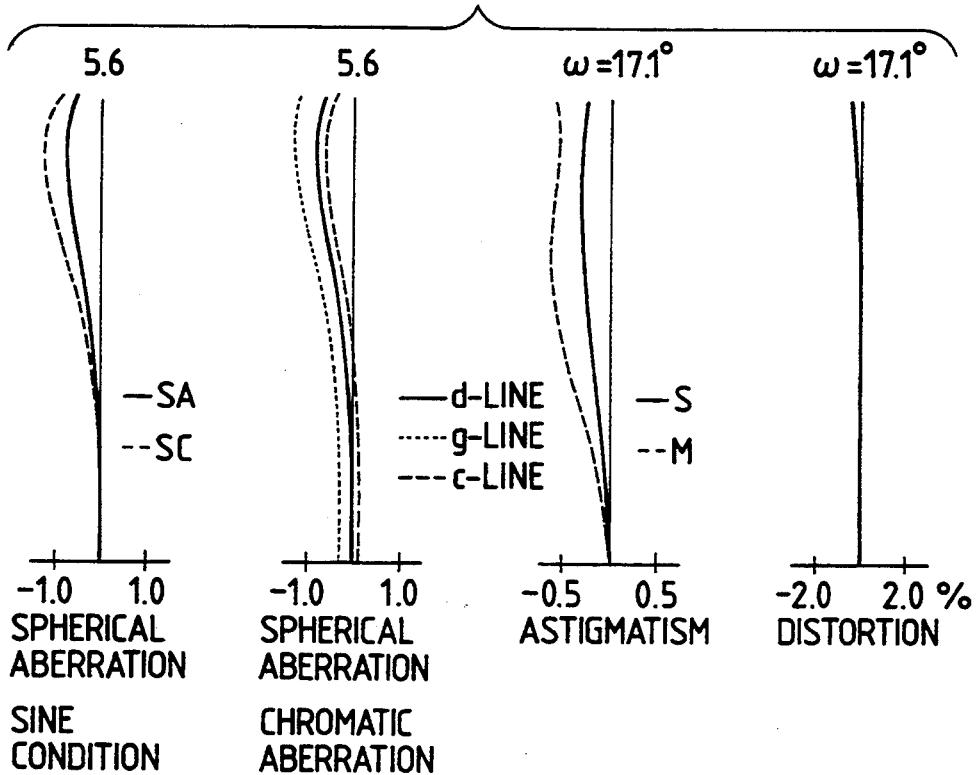
FIG. 15 is a set of graphs plotting the curves of various aberrations that occur in the lens system of Example 4 at the middle-angle end.
Figure 16:
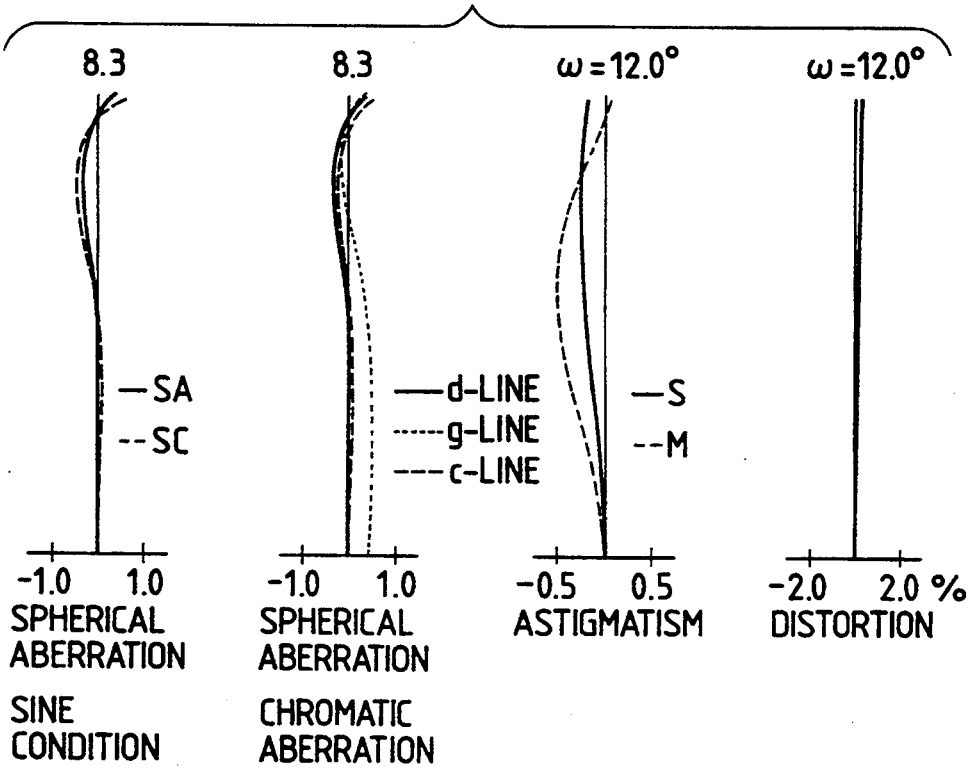
FIG. 16 is a set of graphs plotting the curves of various aberrations that occur in the lens system of Example 4 at the telephoto end.

FIG. 13 is a simplified cross-sectional view showing diagrammatically the composition of the zoom lens system according to Example 4 of the present invention. Specific numerical data are given in Tables 10 and 11. FIGS. 14, 15 and 16 are three sets of graphs plotting the curves of various aberrations that occur in the lens system at the wide-angle, middle-angle and telephoto ends, respectively.

In the lens system of Example 4, surfaces 1, 3, 5, 6 and 8 are aspheric and their aspheric coefficients are listed in Table 12.

TABLE 10

| Surface No. | r | d | n | ν |
|---|---|---|---|---|
| 1 | −909.905 | 1.50 | 1.58547 | 29.9 |
| 2 | 36.538 | 2.57 | | |
| 3 | 19.265 | 6.42 | 1.49176 | 57.4 |
| 4 | −63.275 | variable | | |
| 5 | −23.950 | 7.00 | 1.56907 | 71.3 |
| 6 | −13.365 | variable | | |
| 7 | −13.993 | 1.50 | 1.72916 | 54.7 |
| 8 | −66.591 | | | |

TABLE 11

| f | 39.18 | 70.5 | 102.0 |
|---|---|---|---|
| fB | 9.03 | 30.3 | 50.9 |
| FNo. | 1:4.0 | 1:6.0 | 1:8.3 |
| ω | 29.5° | 17.1° | 12.0° |
| d4 | 4.02 | 13.06 | 17.32 |
| d6 | 19.37 | 9.31 | 5.05 |

TABLE 12

| Surface 1 | Surface 3 |
|---|---|
| K = 0.000000 | K = 0.000000 |
| A4 = −0.307136 × $10^{-4}$ | A4 = 0.206256 × $10^{-4}$ |
| A6 = 0.655687 × $10^{-7}$ | A6 = −0.107901 × $10^{-6}$ |
| A8 = −0.589862 × $10^{-10}$ | A8 = 0.000000 |

| Surface 5 | Surface 6 | Surface 8 |
|---|---|---|
| K = 0.000000 | K = 0.000000 | K = 0.000000 |
| A4 = −0.147086 × $10^{-3}$ | A4 = −0.411337 × $10^{-4}$ | A4 = −0.290114 × $10^{-4}$ |
| A6 = 0.509211 × $10^{-6}$ | A6 = 0.337492 × $10^{-6}$ | A6 = 0.678345 × $10^{-7}$ |
| A8 = −0.448661 × $10^{-7}$ | A8 = −0.934828 × $10^{-8}$ | A8 = −0.280831 × $10^{-9}$ |

EXAMPLE 5

Figure 17:
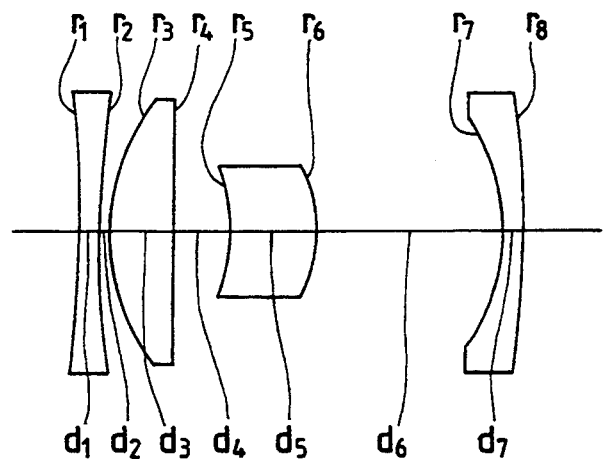
FIG. 17 is a simplified cross-sectional view showing the zoom lens system according to Example 5 of the present invention at the wide-angle end.
Figure 18:
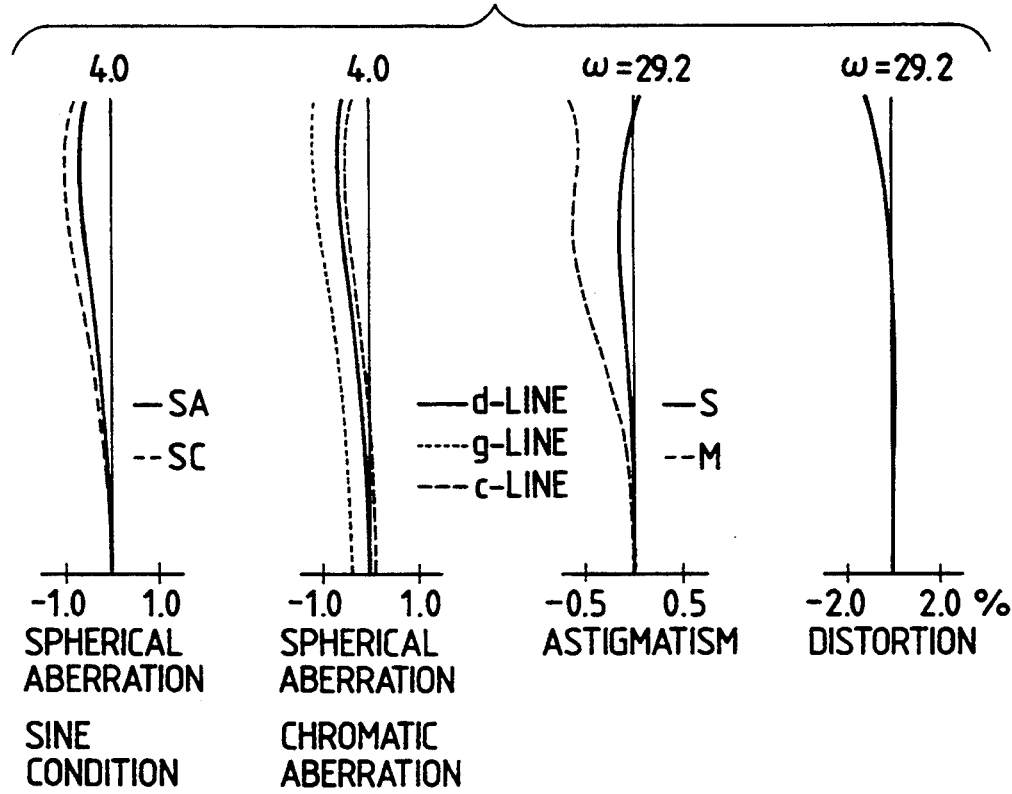
FIG. 18 is a set of graphs plotting the curves of various aberrations that occur in the lens system of Example 5 at the wide-angle end.
Figure 19:
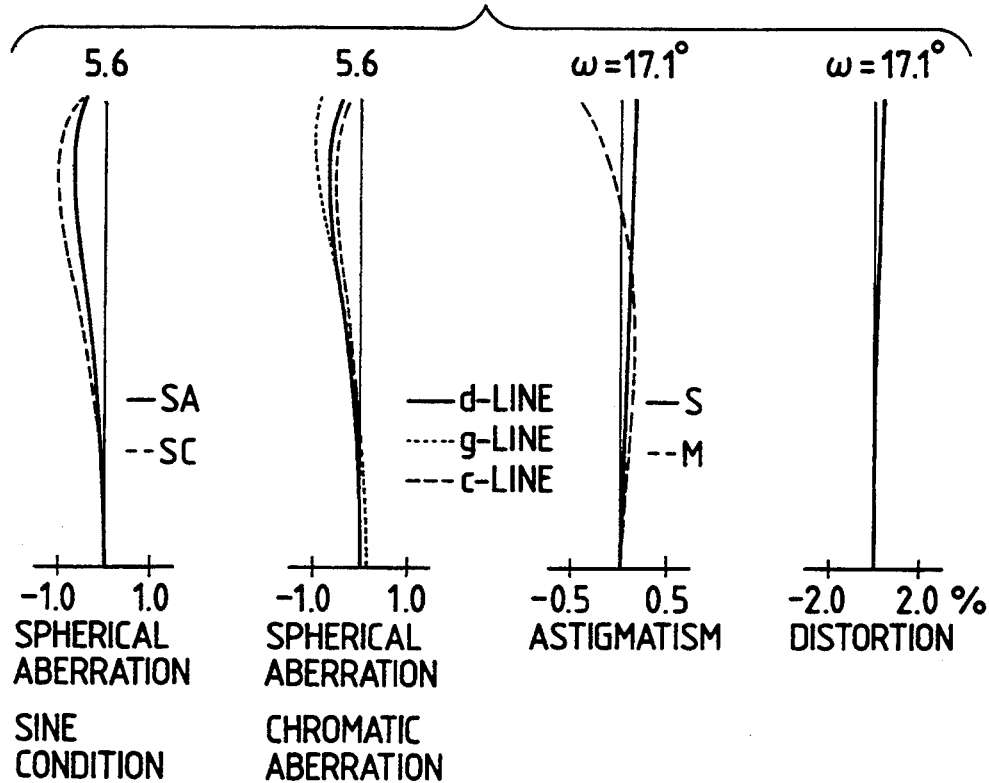
FIG. 19 is a set of graphs plotting the curves of various aberrations that occur in the lens system of Example 5 at the middle-angle end.
Figure 20:
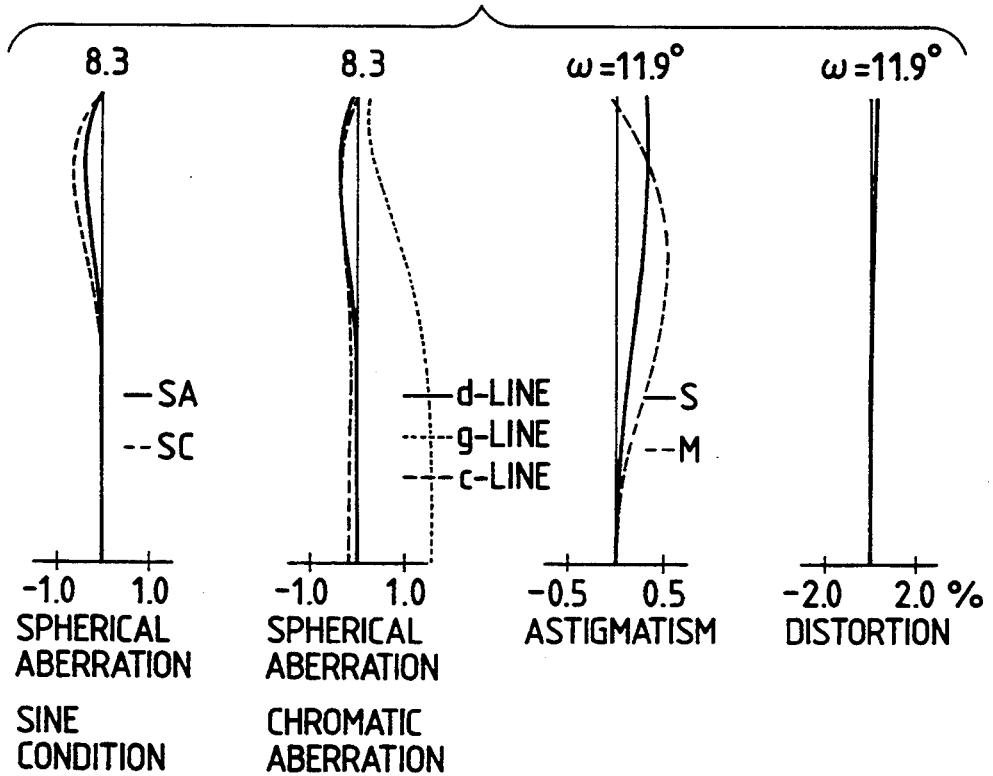
FIG. 20 is a set of graphs plotting the curves of various aberrations that occur in the lens system of Example 5 at the telephoto end.

FIG. 17 is a simplified cross-sectional view showing diagrammatically the composition of the zoom lens system according to Example 5 of the present invention. Specific numerical data are given in Tables 13 and 14. FIGS. 18, 19 and 20 are three sets of graphs plotting the curves of various aberrations that occur in the lens system at the wide-angle, middle-angle and telephoto ends, respectively.

In the lens system of Example 5, surfaces 1, 2, 5, 6, 7 and 8 are aspheric and their aspheric coefficients are listed in Table 15.

TABLE 13

| Surface No. | r | d | n | ν |
|---|---|---|---|---|
| 1 | −85.249 | 1.50 | 1.58547 | 29.9 |
| 2 | 83.053 | 0.75 | | |
| 3 | 15.237 | 4.62 | 1.48749 | 70.2 |
| 4 | −2524.754 | variable | | |
| 5 | −16.153 | 6.40 | 1.56907 | 71.3 |
| 6 | −9.702 | variable | | |
| 7 | −11.909 | 1.50 | 1.72916 | 54.7 |
| 8 | −55.343 | | | |

TABLE 14

| f | 39.18 | 70.0 | 102.0 |
|---|---|---|---|
| fB | 12.86 | 35.0 | 57.4 |
| FNo. | 1:4.0 | 1:6.0 | 1:8.3 |
| ω | 29.2° | 17.1° | 11.95° |
| d4 | 4.02 | 10.25 | 13.16 |
| d6 | 13.85 | 6.60 | 3.69 |

TABLE 15

| Surface 1 | Surface 2 | Surface 5 |
|---|---|---|
| K = 0.000000 | K = 0.000000 | K = 0.000000 |
| A4 = −0.137615 × 10$^{-5}$ | A4 = 0.106053 × 10$^{-4}$ | A4 = −0.264782 × 10$^{-3}$ |
| A6 = −0.577215 × 10$^{-7}$ | A6 = −0.882891 × 10$^{-7}$ | A6 = −0.228310 × 10$^{-5}$ |
| A8 = 0.100246 × 10$^{-8}$ | A8 = 0.151502 × 10$^{-8}$ | A8 = −0.205330 × 10$^{-7}$ |

| Surface 6 | Surface 7 | Surface 8 |
|---|---|---|
| K = 0.000000 | K = 0.000000 | K = 0.000000 |
| A4 = −0.985591 × 10$^{-5}$ | A4 = 0.835198 × 10$^{-4}$ | A4 = 0.212770 × 10$^{-4}$ |
| A6 = 0.140264 × 10$^{-6}$ | A6 = 0.861790 × 10$^{-6}$ | A6 = −0.559959 × 10$^{-7}$ |
| A8 = 0.113491 × 10$^{-7}$ | A8 = −0.686891 × 10$^{-8}$ | A8 = −0.765894 × 10$^{-9}$ |

EXAMPLE 6

Figure 21:
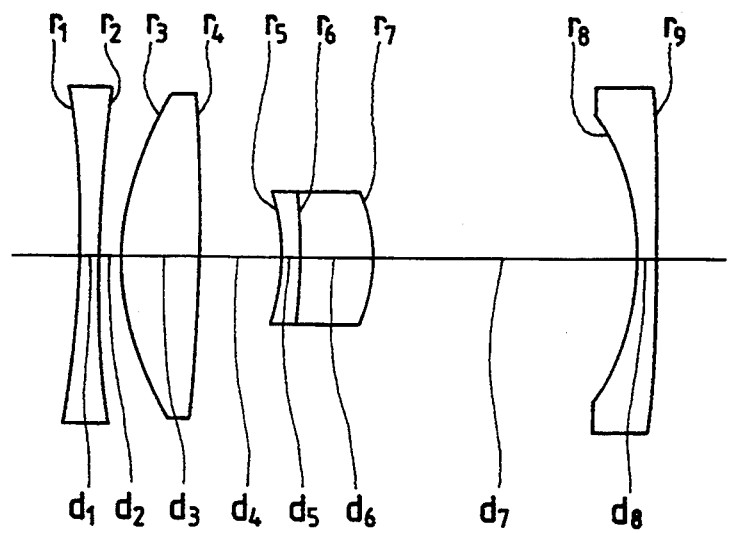
FIG. 21 is a simplified cross-sectional view showing the zoom lens system according to Example 6 of the present invention at the wide-angle end.
Figure 22:
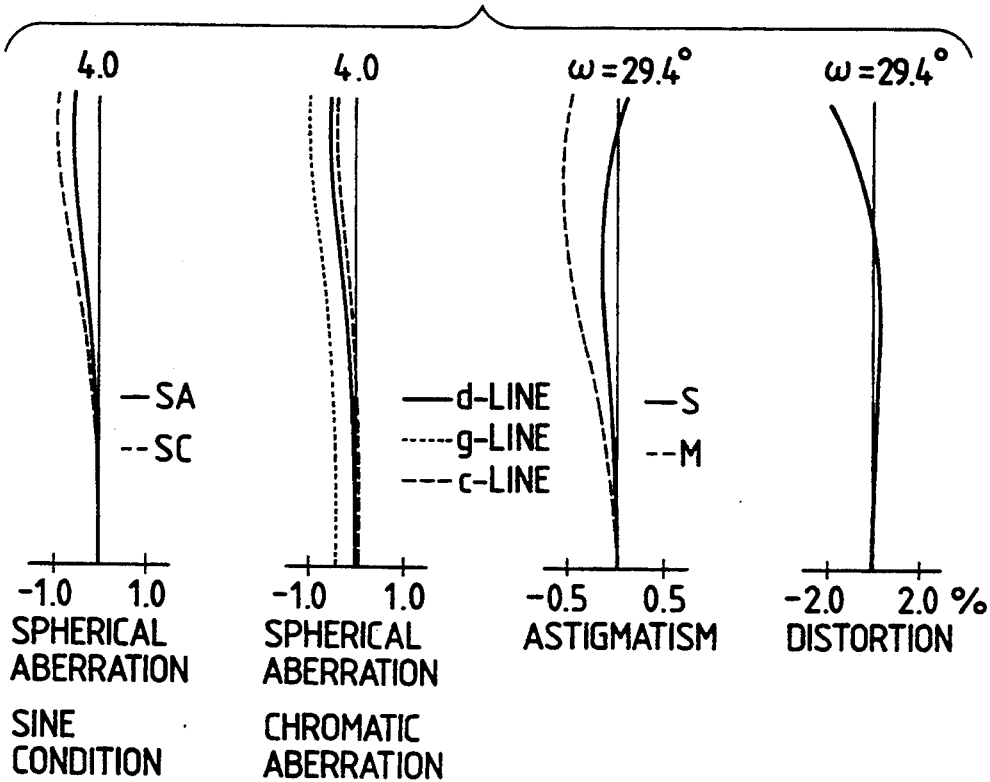
FIG. 22 is a set of graphs plotting the curves of various aberrations that occur in the lens system of Example 6 at the wide-angle end.
Figure 23:
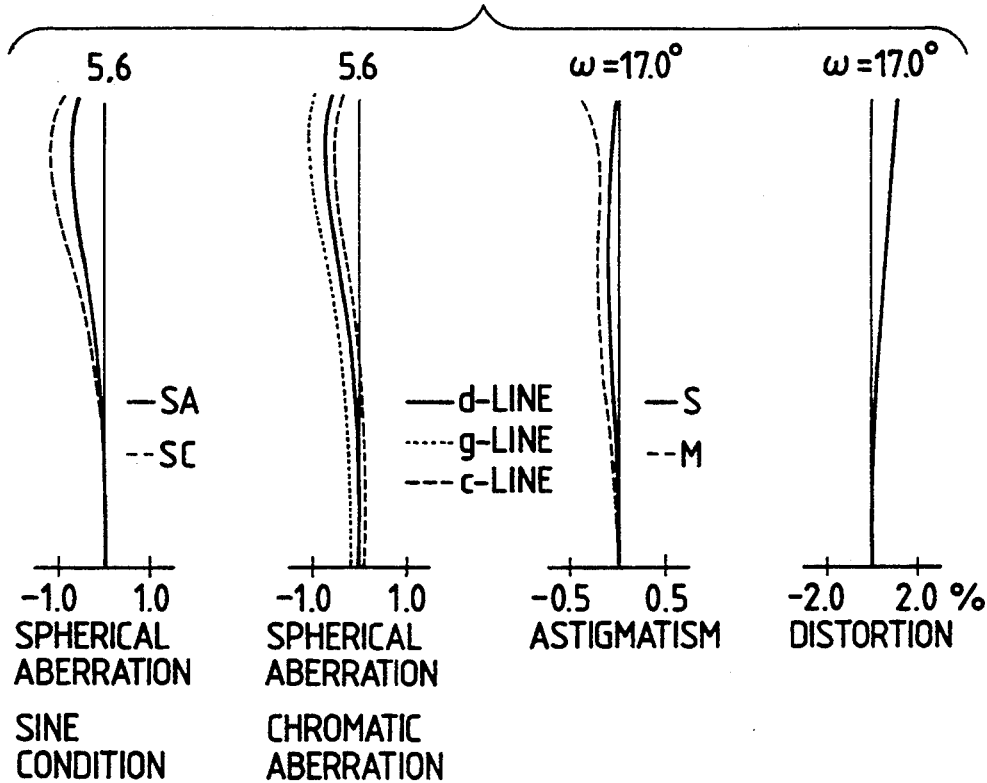
FIG. 23 is a set of graphs plotting the curves of various aberrations that occur in the lens system of Example 6 at the middle-angle end.
Figure 24:
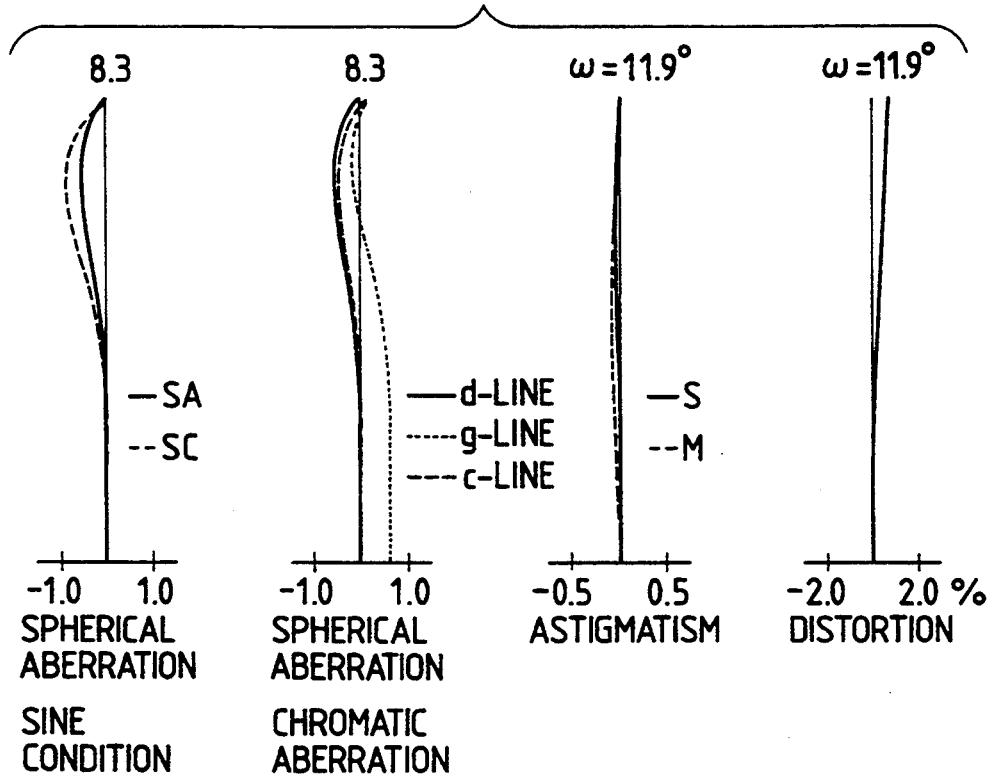
FIG. 24 is a set of graphs plotting the curves of various aberrations that occur in the lens system of Example 6 at the telephoto end.

FIG. 21 is a simplified cross-sectional view showing diagrammatically the composition of the zoom lens system according to Example 6 of the present invention. Specific numerical data are given in Tables 16 and 17. FIGS. 22, 23 and 24 are three sets of graphs plotting the curves of various aberrations that occur in the lens system at the wide-angle, middle-angle and telephoto ends, respectively.

In the lens system of Example 6, surfaces 1, 3, 5, 7 and 9 are aspheric and their aspheric coefficients are listed in Table 18.

TABLE 16

| Surface No. | r | d | n | ν |
|---|---|---|---|---|
| 1 | −90.351 | 1.50 | 1.58547 | 29.9 |
| 2 | 85.274 | 1.68 | | |
| 3 | 20.648 | 6.00 | 1.49176 | 57.4 |
| 4 | −111.980 | variable | | |
| 5 | −18.874 | 1.50 | 1.80100 | 35.0 |
| 6 | −58.058 | 5.50 | 1.65844 | 50.9 |
| 7 | −11.420 | variable | | |
| 8 | −18.548 | 1.50 | 1.72916 | 54.7 |
| 9 | −1921.916 | | | |

TABLE 17

| f | 39.18 | 70.0 | 102.0 |
|---|---|---|---|
| fB | 9.82 | 31.9 | 54.0 |
| FNo. | 1:4.0 | 1:6.0 | 1:8.3 |
| ω | 29.4° | 17.0° | 11.9° |
| d4 | 6.02 | 16.61 | 20.67 |
| d7 | 19.47 | 9.86 | 5.80 |

TABLE 18

| Surface 1 | Surface 3 | Surface 5 |
|---|---|---|
| K = 0.000000 | K = 0.000000 | K = 0.000000 |
| A4 = −0.711362 × 10$^{-5}$ | A4 = −0.143103 × 10$^{-6}$ | A4 = −0.179668 × 10$^{-3}$ |
| A6 = −0.903742 × 10$^{-8}$ | A6 = 0.565142 × 10$^{-8}$ | A6 = −0.383094 × 10$^{-6}$ |
| A8 = 0.808607 × 10$^{-10}$ | A8 = −0.155623 × 10$^{-9}$ | A8 = −0.481017 × 10$^{-7}$ |

| Surface 7 | Surface 9 |
|---|---|
| K = 0.000000 | K = 0.000000 |
| A4 = −0.376400 × 10$^{-4}$ | A4 = −0.168616 × 10$^{-4}$ |
| A6 = 0.451396 × 10$^{-7}$ | A6 = −0.900082 × 10$^{-8}$ |
| A8 = −0.416492 × 10$^{-8}$ | A8 = 0.364100 × 10$^{-10}$ |

EXAMPLE 7

Figure 25:
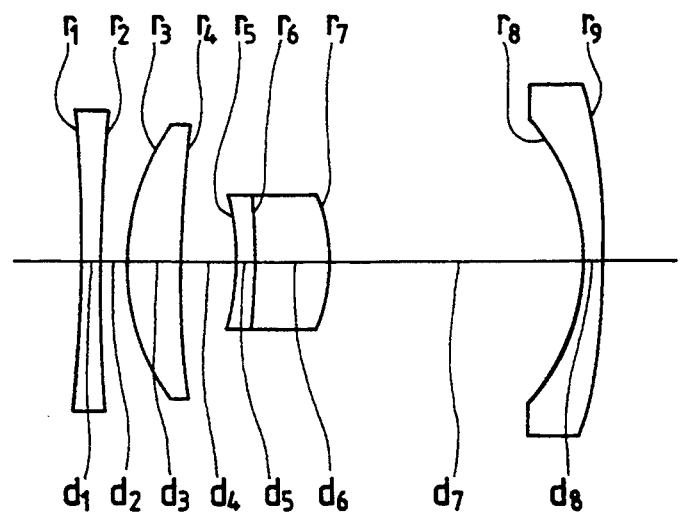
FIG. 25 is a simplified cross-sectional view showing the zoom lens system according to Example 7 of the present invention at the wide-angle end.
Figure 26:
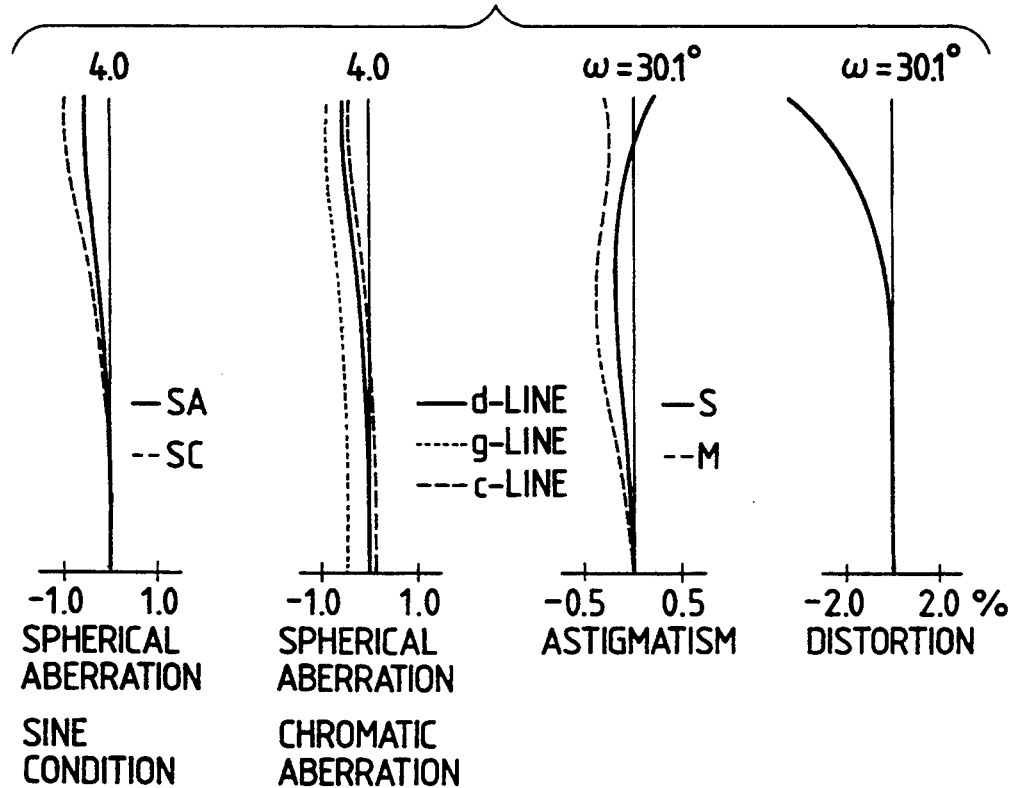
FIG. 26 is a set of graphs plotting the curves of various aberrations that occur in the lens system of Example 7 at the wide-angle end.
Figure 27:
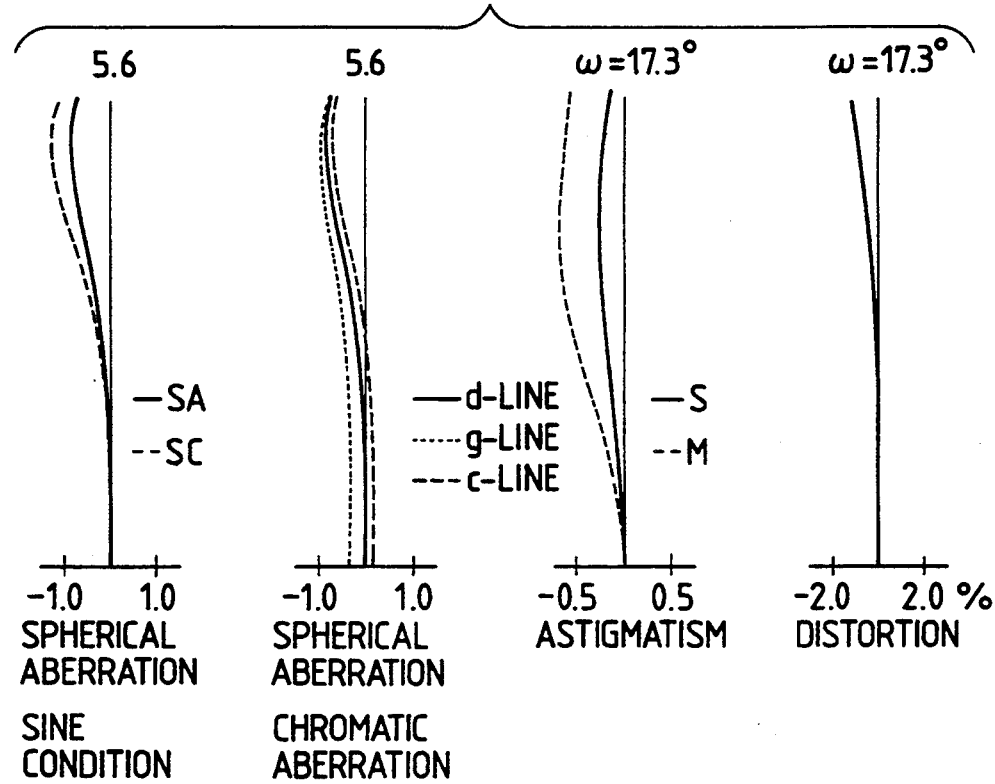
FIG. 27 is a set of graphs plotting the curves of various aberrations that occur in the lens system of Example 7 at the middle-angle end.
Figure 28:
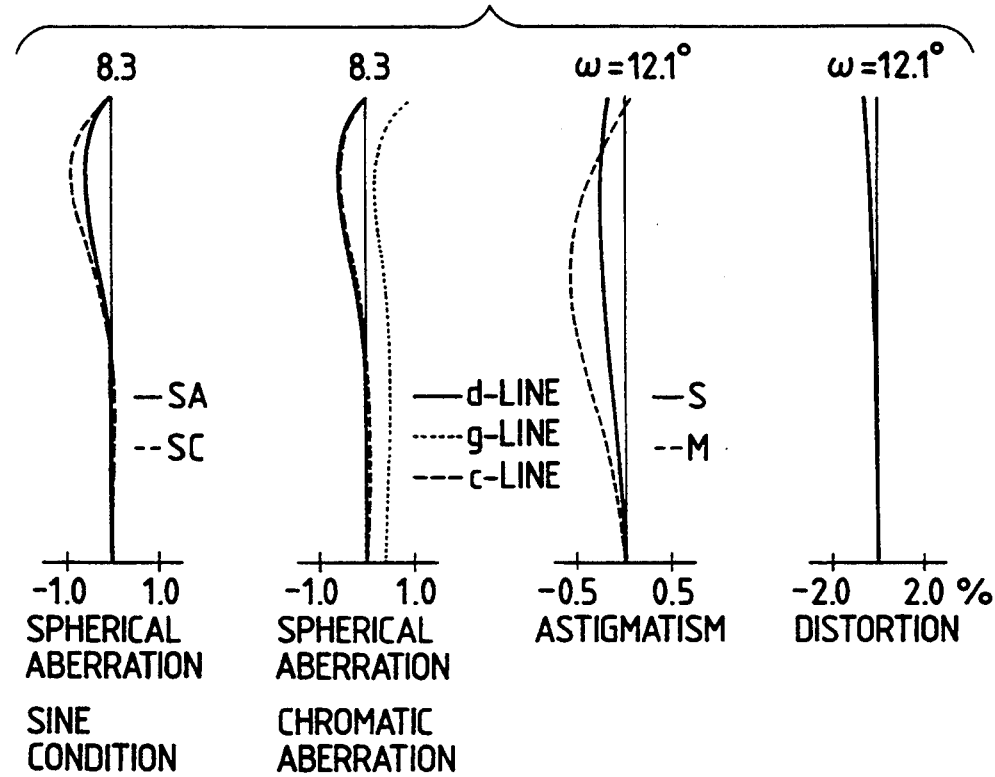
FIG. 28 is a set of graphs plotting the curves of various aberrations that occur in the lens system of Example 7 at the telephoto end.

FIG. 25 is a simplified cross-sectional view showing diagrammatically the composition of the zoom lens system according to Example 7 of the present invention. Specific numerical data are given in Tables 19 and 20. FIGS. 26, 27 and 28 are three sets of graphs plotting the curves of various aberrations that occur in the lens system at the wide-angle, middle-angle and telephoto ends, respectively.

In the lens system of Example 7, surfaces 1, 5, 7 and 9 are aspheric and their aspheric coefficients are listed in Table 21.

TABLE 19

| Surface No. | r | d | n | ν |
|---|---|---|---|---|
| 1 | −164.790 | 1.50 | 1.58547 | 29.9 |
| 2 | 127.435 | 2.02 | | |
| 3 | 16.572 | 3.82 | 1.48749 | 70.2 |
| 4 | 65.131 | variable | | |
| 5 | −23.371 | 1.50 | 1.80518 | 25.4 |

TABLE 19-continued

| Surface No. | r | d | n | ν |
|---|---|---|---|---|
| 6 | −39.403 | 5.50 | 1.62374 | 47.1 |
| 7 | −12.264 | variable | | |
| 8 | −14.566 | 1.50 | 1.72916 | 54.7 |
| 9 | −76.186 | | | |

TABLE 20

| f | 39.18 | 70.4 | 102.0 |
|---|---|---|---|
| fB | 9.67 | 32.3 | 54.6 |
| FNo. | 1:4.0 | 1:6.0 | 1:8.3 |
| ω | 30.1° | 17.3° | 12.05° |
| d4 | 4.02 | 12.21 | 15.92 |
| d7 | 18.98 | 9.78 | 6.06 |

TABLE 21

| Surface 1 | Surface 5 |
|---|---|
| K = 0.000000 | K = 0.000000 |
| A4 = −0.470412 × $10^{-5}$ | A4 = −0.151371 × $10^{-3}$ |
| A6 = −0.197002 × $10^{-7}$ | A6 = −0.376409 × $10^{-6}$ |
| A8 = 0.909167 × $10^{-10}$ | A8 = −0.327915 × $10^{-7}$ |

| Surface 7 | Surface 9 |
|---|---|
| K = 0.000000 | K = 0.000000 |
| A4 = −0.363448 × $10^{-4}$ | A4 = −0.336075 × $10^{-4}$ |
| A6 = −0.300621 × $10^{-6}$ | A6 = 0.666300 × $10^{-7}$ |
| A8 = −0.783003 × $10^{-11}$ | A8 = −0.298331 × $10^{-9}$ |

EXAMPLE 8

Figure 29:
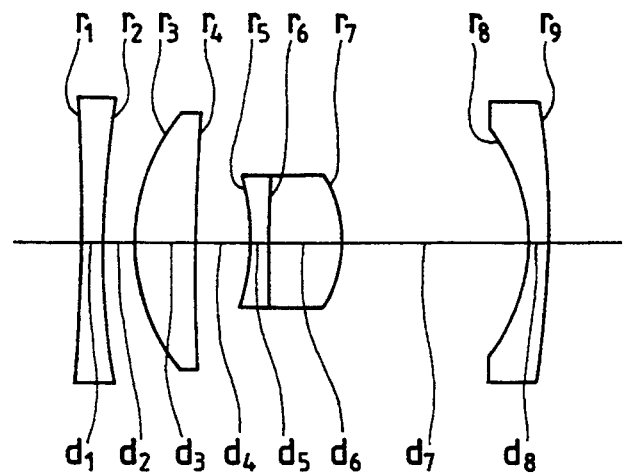
FIG. 29 is a simplified cross-sectional view showing the zoom lens system according to Example 8 of the present invention at the wide-angle end.
Figure 30:
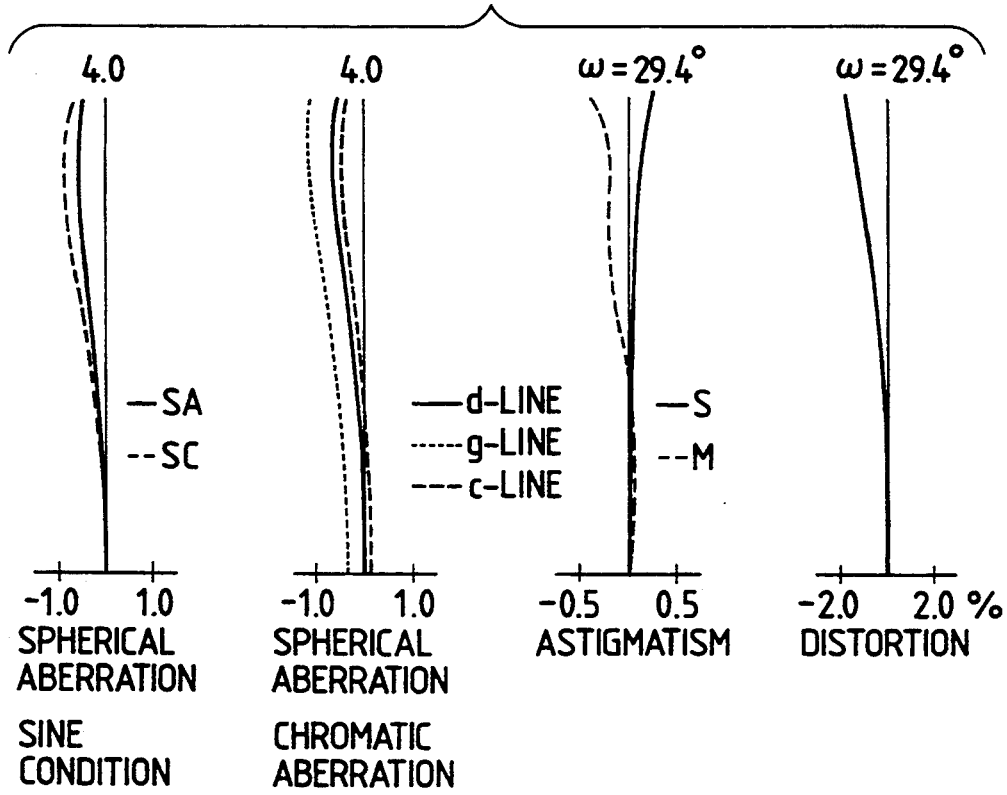
FIG. 30 is a set of graphs plotting the curves of various aberrations that occur in the lens system of Example 8 at the wide-angle end.
Figure 31:
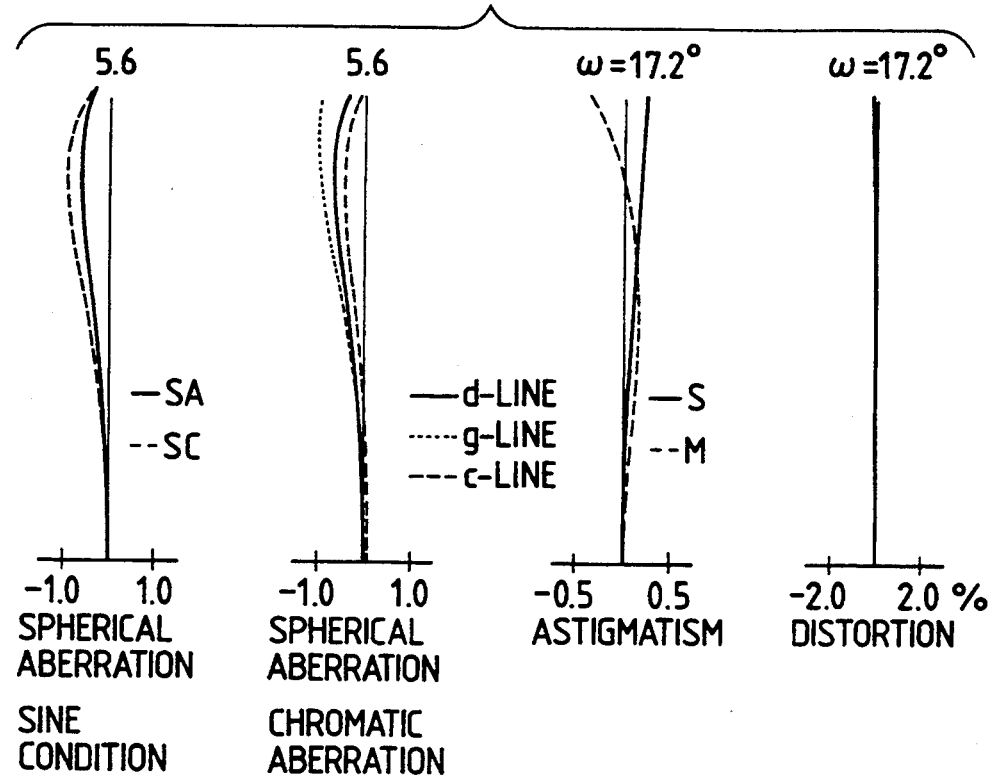
FIG. 31 is a set of graphs plotting the curves of various aberrations that occur in the lens system of Example 8 at the middle-angle end.
Figure 32:
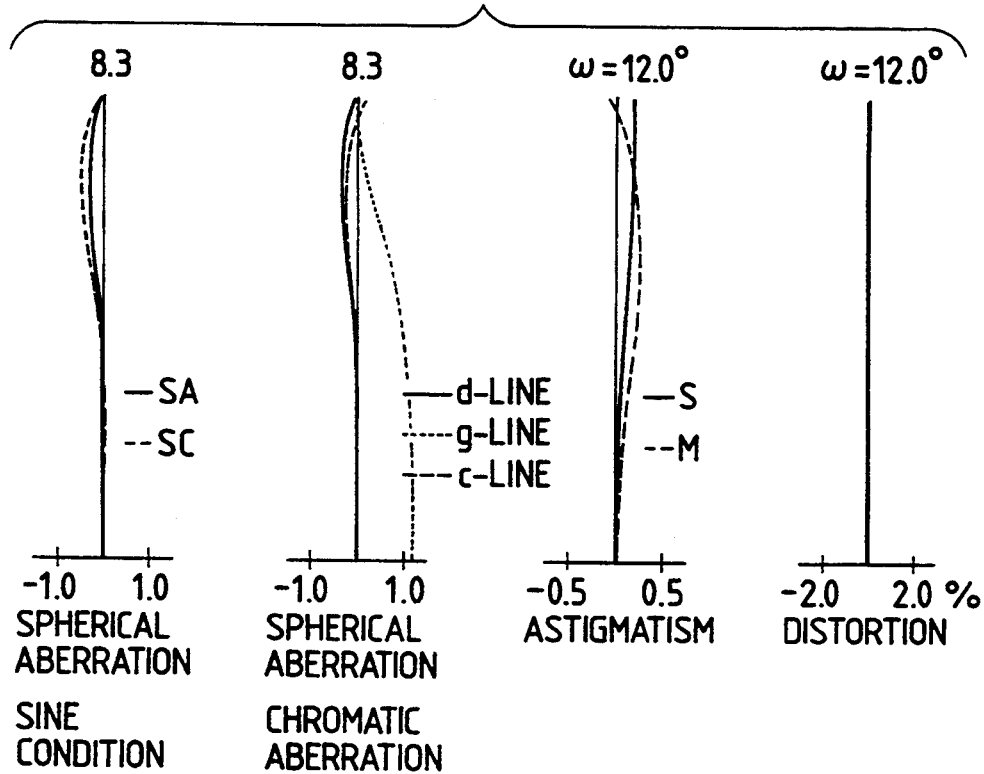
FIG. 32 is a set of graphs plotting the curves of various aberrations that occur in the lens system of Example 8 at the telephoto end.

FIG. 29 is a simplified cross-sectional view showing diagrammatically the composition of the zoom lens system according to Example 8 of the present invention. Specific numerical data are given in Tables 22 and 23. FIGS. 30, 31 and 32 are three sets of graphs plotting the curves of various aberrations that occur in the lens system at the wide-angle, middle-angle and telephoto ends, respectively.

In the lens system of Example 8, surfaces 1, 2, 5, 6, 7, 8 and 9 are aspheric and their aspheric coefficients are listed in Table 24.

TABLE 22

| Surface No. | r | d | n | ν |
|---|---|---|---|---|
| 1 | −119.743 | 1.50 | 1.58547 | 29.9 |
| 2 | 86.164 | 2.40 | | |
| 3 | 14.695 | 4.27 | 1.48749 | 70.2 |
| 4 | 165.302 | variable | | |
| 5 | −19.702 | 1.50 | 1.74400 | 44.8 |
| 6 | 485.910 | 5.40 | 1.56883 | 56.3 |
| 7 | −9.399 | variable | | |
| 8 | −11.193 | 1.50 | 1.72916 | 54.7 |
| 9 | −53.182 | | | |

TABLE 23

| f | 39.19 | 70.2 | 102.0 |
|---|---|---|---|

TABLE 23-continued

| fB | 12.62 | 33.9 | 55.4 |
|---|---|---|---|
| FNo. | 1:4.0 | 1:6.0 | 1:8.3 |
| ω | 29.4° | 17.2° | 12.0° |
| d4 | 4.02 | 9.86 | 12.55 |
| d7 | 14.08 | 7.22 | 4.53 |

TABLE 24

| Surface 1 | Surface 2 | Surface 5 |
|---|---|---|
| K = 0.000000 | K = 0.000000 | K = 0.000000 |
| A4 = 0.516051 × $10^{-5}$ | A4 = 0.151644 × $10^{-4}$ | A4 = −0.237346 × $10^{-3}$ |
| A6 = −0.276735 × $10^{-7}$ | A6 = −0.316470 × $10^{-7}$ | A6 = −0.196777 × $10^{-5}$ |
| A8 = 0.620461 × $10^{-9}$ | A8 = 0.904350 × $10^{-9}$ | A8 = −0.443798 × $10^{-7}$ |

| Surface 7 | Surface 8 | Surface 9 |
|---|---|---|
| K = 0.000000 | K = 0.000000 | K = 0.000000 |
| A4 = −0.535100 × $10^{-5}$ | A4 = 0.703969 × $10^{-4}$ | A4 = −0.251051 × $10^{-5}$ |
| A6 = −0.515360 × $10^{-7}$ | A6 = 0.137935 × $10^{-5}$ | A6 = 0.290215 × $10^{-6}$ |
| A8 = 0.484101 × $10^{-8}$ | A8 = −0.392132 × $10^{-8}$ | A8 = −0.164928 × $10^{-8}$ |

EXAMPLE 9

Figure 33:
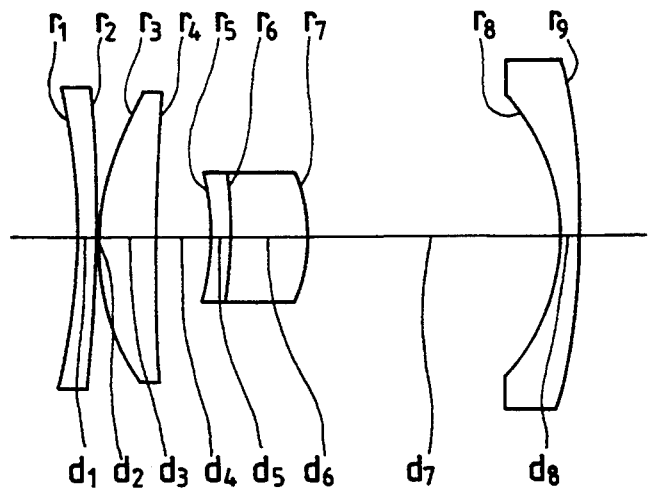
FIG. 33 is a simplified cross-sectional view showing the zoom lens system according to Example 9 of the present invention at the wide-angle end.
Figure 34:
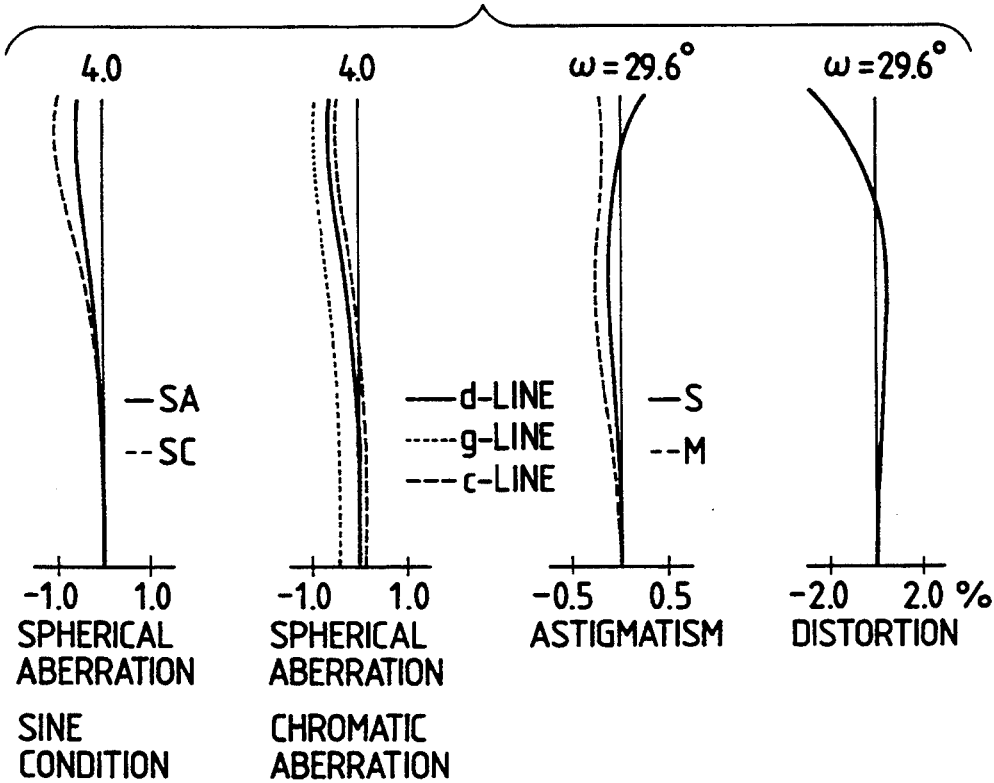
FIG. 34 is a set of graphs plotting the curves of various aberrations that occur in the lens system of Example 9 at the wide-angle end.
Figure 35:
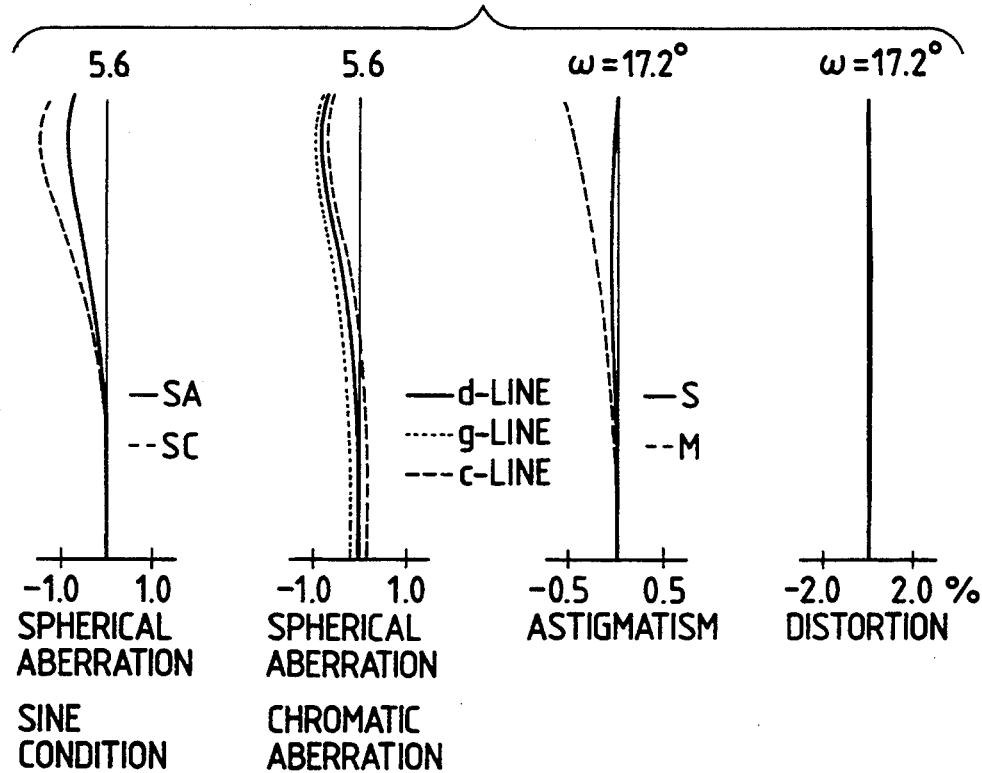
FIG. 35 is a set of graphs plotting the curves of various aberrations that occur in the lens system of Example 9 at the middle-angle end.
Figure 36:
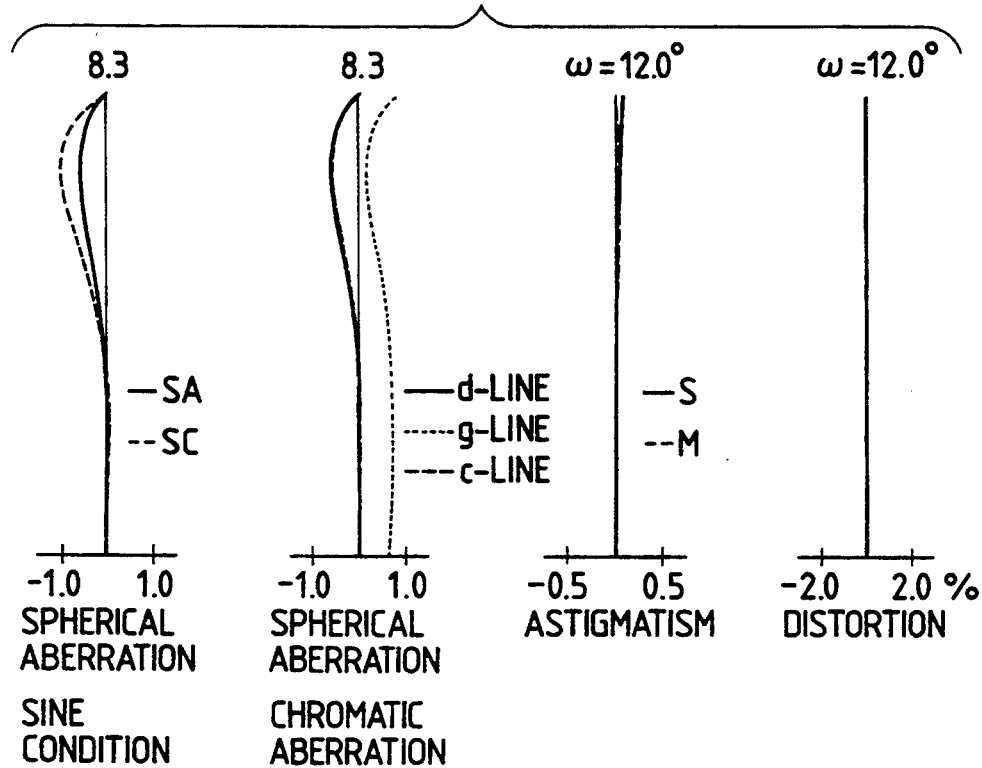
FIG. 36 is a set of graphs plotting the curves of various aberrations that occur in the lens system of Example 9 at the telephoto end.

FIG. 33 is a simplified cross-sectional view showing diagrammatically the composition of the zoom lens system according to Example 9 of the present invention. Specific numerical data are given in Tables 25 and 26. FIGS. 34, 35 and 36 are three sets of graphs plotting the curves of various aberrations that occur in the lens system at the wide-angle, middle-angle and telephoto ends, respectively.

In the lens system of Example 9, surfaces 3, 5, 7 and 9 are aspheric and their aspheric coefficients are listed in Table 27.

TABLE 25

| Surface No. | r | d | n | ν |
|---|---|---|---|---|
| 1 | −45.291 | 1.50 | 1.80518 | 25.4 |
| 2 | −92.810 | 0.20 | | |
| 3 | 18.554 | 4.15 | 1.51633 | 64.1 |
| 4 | 168.127 | variable | | |
| 5 | −22.329 | 1.50 | 1.80518 | 25.4 |
| 6 | −33.438 | 5.50 | 1.62374 | 47.1 |
| 7 | −12.452 | variable | | |
| 8 | −14.559 | 1.50 | 1.72916 | 54.7 |
| 9 | −85.136 | | | |

TABLE 26

| f | 39.18 | 70.2 | 102.0 |
|---|---|---|---|
| fB | 9.34 | 30.7 | 51.9 |
| FNo. | 1:4.0 | 1:6.0 | 1:8.3 |
| ω | 29.6° | 17.1° | 12.0° |
| d4 | 4.02 | 12.34 | 16.26 |
| d7 | 18.93 | 9.58 | 5.67 |

TABLE 27

| Surface 3 | Surface 5 |
|---|---|
| K = 0.000000 | K = 0.000000 |
| A4 = −0.294363 × $10^{-5}$ | A4 = −0.136991 × $10^{-3}$ |
| A6 = −0.116804 × $10^{-7}$ | A6 = −0.411833 × $10^{-6}$ |
| A8 = 0.193023 × $10^{-10}$ | A8 = −0.262701 × $10^{-7}$ |

| Surface 7 | Surface 9 |
|---|---|
| K = 0.000000 | K = 0.000000 |
| A4 = −0.309498 × $10^{-4}$ | A4 = −0.294310 × $10^{-4}$ |
| A6 = −0.530566 × $10^{-6}$ | A6 = 0.448673 × $10^{-7}$ |
| A8 = 0.838140 × $10^{-8}$ | A8 = −0.222366 × $10^{-9}$ |

The following Table 28 shows how conditions (a) to (g) specified herein are satisfied in respective Examples 1 to 5, and Table 29 shows how those conditions are satisfied in Examples 6 to 9. In Examples 6 to 9, the second lens group is composed of a cemented lens and, hence, no numerical data are given for conditions (f) and (g) which assume that the second lens group is solely composed of a simple lens. Symbols $\Delta Io$, $\Delta Vo$, $\Delta Ii$ and $\Delta Vi$ that appear in Tables 28 and 29 mean as follows: $\Delta Io$, the amount of change in spherical aberration coefficient that is caused by the concave aspheric surface on the object side of the second lens group; $\Delta Vo$, the amount of change in distortion coefficient that is caused by that concave aspheric surface; $\Delta Ii$, the amount of change spherical aberration coefficient that is caused by the convex aspheric surface on the image side of the second lens group; and $\Delta Vi$, the amount of change in distortion coefficient that is caused by that convex aspheric surface.

TABLE 28

|  | Example 1 | Example 2 | Example 3 | Example 4 | Example 5 |
| --- | --- | --- | --- | --- | --- |
| (a) rIIo/fs | −0.634 | −0.628 | 0.661 | −0.611 | −0.412 |
| (b) rIIi/fs | −0.343 | −0.342 | −0.330 | −0.341 | −0.248 |
| (c) dII/fs | 0.179 | 0.179 | 0.179 | 0.179 | 0.163 |
| (d) ΔXo/fs | −0.00155 | −0.00168 | −0.00182 | −0.00157 | −0.00286 |
| ΔIo | −29.7 | −32.4 | −34.7 | −30.0 | −44.3 |
| ΔVo | 0.12 | 0.13 | 0.13 | 0.12 | 0.17 |
| (e) ΔXi/fs | −0.00048 | −0.00052 | −0.00051 | −0.00046 | −0.00001 |
| ΔIi | 7.2 | 8.2 | 8.1 | 9.1 | 2.1 |
| ΔVi | −0.00 | −0.00 | −0.00 | −0.00 | −0.00 |
| (f) NII | 1.569 | 1.569 | 1.569 | 1.569 | 1.569 |
| (g) νdII | 71.3 | 71.3 | 71.3 | 71.3 | 71.3 |

TABLE 29

|  | Example 6 | Example 7 | Example 8 | Example 9 |
| --- | --- | --- | --- | --- |
| (a) rIIo/fs | −0.482 | −0.597 | −0.503 | −0.570 |
| (b) rIIi/fs | −0.291 | −0.313 | −0.240 | −0.318 |
| (c) dII/fs | 0.179 | 0.179 | 0.176 | 0.179 |
| (d) ΔXo/fs | −0.00172 | −0.00166 | −0.00274 | −0.00133 |
| ΔIo | −43.6 | −39.3 | −53.1 | −34.5 |
| ΔVo | 0.15 | 0.14 | 0.22 | 0.13 |
| (e) ΔXi/fs | −0.00054 | −0.0058 | −0.00006 | −0.00048 |
| ΔIi | 10.8 | 9.3 | 1.2 | 7.5 |
| ΔVi | −0.00 | −0.00 | −0.00 | −0.00 |

As described on the foregoing pages, the present invention provides a zoom lens system that features a zoom ratio of at least 2.5 using no more than 4 or 5 lens elements and which has an F number of about 1:4–8 to make itself suitable for use with still cameras.

What is claimed is:

1. A zoom lens system that comprises, in order from an object side, a positive first lens group, a positive second lens group and a negative third lens group, the second lens group having aspheric surfaces on its surface closest to an object and on its surface closest to an image, and in which all of said first, second and third lens groups are moved towards the object during a zoom from a wide-angle end to a narrow-angle end, said lens system further satisfying the following conditions:

$$-0.9 < rIIo/fs < -0.3 \quad (a)$$

$$-0.5 < rIIi/fs < -0.2 \quad (b)$$

$$0.1 < dII/fs < 0.3 \quad (c)$$

$$-0.005 < \Delta Xo/fs < 0 \quad (d)$$

$$-0.001 < \Delta Xi/fs < 0 \quad (e)$$

where rIIo: the radius of curvature, relative to the paraxial ray, of the surface closest to the object side of the second lens group;

rIIi: the radius of curvature, relative to the paraxial ray, of the surface closest to the image side of the second lens group;

fs: the focal length of the overall system at the wide-angle end;

dII: the sum of the thicknesses of lens elements in the second lens group;

$\Delta Xo$: the amount of asphericity of the surface closest to the object side of the second lens group; and $\Delta Xi$: the amount of asphericity of the surface closest to the image side of the second lens group.

2. A zoom lens system according to claim 1 wherein said second lens group is solely composed of a single lens element and satisfies the following conditions:

$$1.54 < nII \quad (f)$$

$$65 < \nu dII \quad (g)$$

where nII: the refractive index of the second lens group at the d-line; and

νdII: the Abbe number of the second lens group at the d-line.

3. A zoom lens system according to claim 1 wherein said second lens group is composed of an achromatic cemented lens which consists of a negative lens element and a positive lens element.

4. A zoom lens system that essentially consists, in order from an object side, of a positive first lens group, a positive second lens group and a negative third lens group, said first lens group being composed, in order from the object side, of a negative lens element and a positive lens element, said second lens group being composed of a single positive-meniscus lens that has a concave aspheric surface on the object side and a convex aspheric surface on an image side, and said third lens group being composed of a single negative-meniscus lens having a convex surface directed towards an image.

5. A zoom lens system according to claim 4, further satisfying the following conditions:

$$-0.9 < rIIo/fs < -0.3 \quad (a)$$

$$-0.5 < rIIi/fs < -0.2 \quad (b)$$

$$0.1 < dII/fs < 0.3 \quad (c)$$

$$-0.005 < \Delta Xo/fs < 0 \quad (d)$$

$$-0.001 < \Delta Xi/fs < 0 \quad (e)$$

where rIIo: the radius of curvature, relative to the paraxial ray, of the surface on the object side of the second lens group;

rIIi: the radius of curvature, relative to the paraxial, of the surface on the image side of the second lens group;

fs: the focal length of the overall system at the wide-angle end;

dII: the sum of the thicknesses of lens elements in the second lens group;

$\Delta Xo$: the amount of asphericity of the surface on the object side of the second lens group; and ΔXi: the amount of asphericity of the surface on the image side of the second lens group.

6. A zoom lens system according to claim 5 wherein said second lens group satisfies the following conditions:

$$1.54 < nII \tag{f}$$

$$65 < \nu dII \tag{g}$$

where
- nII: the refractive index of the second lens group at the d-line; and
- $\nu$dII: the Abbe number of the second lens group at the d-line.

7. A zoom lens system that essentially consists, in order from an object side, of a positive first lens group, a positive second lens group and a negative third lens group, said first lens group composed, in order from the object side, of a negative lens element and a positive lens element, said second lens group being a cemented lens having such a meniscus that a concave surface is directed towards the object and comprising, in order from the object side, a negative lens element that has a concave aspheric surface directed towards the object and a positive lens element cemented thereto that has a convex aspheric surface directed towards an image, and said third lens group being composed of a single negative-meniscus lens having a convex surface directed towards the image.

8. A zoom lens system according to claim 7, further satisfying the following conditions:

$$-0.9 < rIIo/fs < -0.3 \tag{a}$$

$$-0.5 < rIIi/fs < -0.2 \tag{b}$$

$$0.1 < dII/fs < 0.3 \tag{c}$$

$$-0.005 < \Delta Xo/fs < 0 \tag{d}$$

$$-0.001 < \Delta Xi/fs < 0 \tag{e}$$

where
- rIIo: the radius of curvature, relative to the paraxial ray, of the surface closest to the object side of the second lens group;
- rIIi: the radius of curvature, relative to the paraxial ray, of the surface on the image side of the second lens group;
- fs: the focal length of the overall system at the wide-angle end;
- dII: the sum of the thicknesses of lens elements in the second lens group;
- ΔXo: the amount of asphericity, relative to the paraxial ray, of the surface closest to the object side of the second lens group; and
- ΔXi: the amount of asphericity, relative to the paraxial ray, of the surface closest to the image side of the second lens group.

* * * * *